(12) United States Patent
Yang et al.

(10) Patent No.: US 11,570,780 B2
(45) Date of Patent: Jan. 31, 2023

(54) PROBABILISTIC AMPLITUDE SHAPING

(71) Applicant: QUALCOMM Incorporated, San Diego, CA (US)

(72) Inventors: Lin Yang, San Diego, CA (US); Bin Tian, San Diego, CA (US); Dung Ngoc Doan, San Diego, CA (US); Jialing Li Chen, San Diego, CA (US); Didier Johannes Richard Van Nee, Tull en't Waal (NL)

(73) Assignee: QUALCOMM INCORPORATED, San Diego, CA (US)

( * ) Notice: Subject to any disclaimer, the term of this patent is extended or adjusted under 35 U.S.C. 154(b) by 70 days.

(21) Appl. No.: 17/022,063

(22) Filed: Sep. 15, 2020

(65) Prior Publication Data

US 2021/0084654 A1 Mar. 18, 2021

Related U.S. Application Data

(60) Provisional application No. 62/901,191, filed on Sep. 16, 2019.

(51) Int. Cl.
*H04W 72/04* (2009.01)
*H04L 69/323* (2022.01)

(52) U.S. Cl.
CPC ....... *H04W 72/0466* (2013.01); *H04L 69/323* (2013.01)

(58) Field of Classification Search
CPC .......................... H04W 72/0466; H04L 69/323
See application file for complete search history.

(56) References Cited

U.S. PATENT DOCUMENTS

| 9,876,614 | B1 * | 1/2018 | Sun ..................... H04L 1/1835 |
| 10,069,519 | B1 | 9/2018 | Millar et al. |
| 10,742,472 | B1 * | 8/2020 | Van Nee ............. H04L 27/3405 |
| 2012/0195302 | A1 | 8/2012 | Park et al. |
| 2016/0286011 | A1 | 9/2016 | Kasher et al. |
| 2022/0123901 | A1 * | 4/2022 | Lopez .................. H04L 1/0088 |

FOREIGN PATENT DOCUMENTS

CA         2616855 A1 *  8/2007  ......... H04L 63/0428

OTHER PUBLICATIONS

International Search Report and Written Opinion—PCT/US2020/050976—ISA/EPO—dated Dec. 18, 2020.

* cited by examiner

*Primary Examiner* — Jianye Wu
(74) *Attorney, Agent, or Firm* — Kevin Donnelly

(57) ABSTRACT

This disclosure provides methods, devices and systems for encoding data for wireless communication to achieve a desired amplitude distribution. Some implementations more specifically relate to performing an encoding operation to shape the amplitudes of the resultant symbols such that the amplitudes have a non-uniform distribution. In some implementations of the non-uniform distribution, the probabilities associated with the respective amplitudes generally increase with decreasing amplitude. Some implementations enable the tracking of MPDU boundaries to facilitate successful decoding by a receiving device. Additionally or alternatively, some implementations enable the determination of a packet length after performing the amplitude shaping, which enables a transmitting device to determine the number of padding bits to add to the payload and to signal the packet length to a receiving device so that the receiving device may determine the duration of the packet.

17 Claims, 21 Drawing Sheets

PROBABILISTIC AMPLITUDE SHAPING

PRIORITY INFORMATION

The present application for patent claims priority under 35 U.S.C. § 119 to U.S. Provisional Patent Application No. 62/901,191, entitled "PROBABILISTIC AMPLITUDE SHAPING," filed 16 Sep. 2019 and assigned to the assignee hereof, which is hereby expressly incorporated by reference herein.

TECHNICAL FIELD

This disclosure relates generally to wireless communication, and more specifically, to encoding data to achieve a non-uniform amplitude distribution.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Transmitting and receiving devices may support the use of various modulation and coding schemes (MCSs) to transmit and receive data so as to optimally take advantage of wireless channel conditions, for example, to increase throughput, reduce latency, or enforce various quality of service (QoS) parameters. For example, existing technology supports the use of up to 1024-QAM and it is expected that 4096-QAM (also referred to as "4 k QAM") will also be implemented. 1024-QAM and 4096-QAM, among other MCSs, involve the use of low-density parity check (LDPC) encoding. An LDPC encoding operation may be performed on the data bits of a code block to, for example, add redundancy for forward error correction (FEC).

Real world wireless channels generally contain noise that imposes a limit on the maximum rate at which data can be communicated. The Shannon-Hartley theorem establishes an upper bound or limit (referred to as the "Shannon bound") that represents the absolute channel capacity of a link, that is, the maximum amount of error-free information per unit time that can be transmitted over a particular bandwidth in the presence of noise. Unfortunately, the channel capacity achievable with LDPC encoding shows a significant gap to the Shannon bound even for high MCSs. Additionally, to be able to use high MCSs, including 1024-QAM and 4096-QAM, a high signal-to-noise ratio (SNR) is required, but it may be difficult to obtain the SNRs needed for such high MCSs.

SUMMARY

The systems, methods and devices of this disclosure each have several innovative aspects, no single one of which is solely responsible for the desirable attributes disclosed herein.

This disclosure provides methods, devices and systems for encoding data for wireless communication to achieve a desired amplitude distribution. Some implementations more specifically relate to performing an encoding operation to shape the amplitudes of the resultant symbols such that the amplitudes have a non-uniform distribution. In some implementations of the non-uniform distribution, the probabilities associated with the respective amplitudes generally increase with decreasing amplitude. Some implementations enable the tracking of MPDU boundaries to facilitate successful decoding by a receiving device. Additionally or alternatively, some implementations enable the determination of a packet length after performing the amplitude shaping, which enables a transmitting device to determine the number of padding bits to add to the payload and to signal the packet length to a receiving device so that the receiving device may determine the duration of the packet.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

This disclosure provides methods, devices and systems for encoding data for wireless communication to achieve a desired amplitude distribution. Some implementations more specifically relate to performing an encoding operation to shape the amplitudes of the resultant symbols such that the amplitudes have a non-uniform distribution. In some implementations of the non-uniform distribution, the probabilities associated with the respective amplitudes generally increase with decreasing amplitude. Some implementations enable the tracking of MPDU boundaries to facilitate successful decoding by a receiving device. Additionally or alternatively, some implementations enable the determination of a packet length after performing the amplitude shaping, which enables a transmitting device to determine the number of padding bits to add to the payload and to signal the packet length to a receiving device so that the receiving device may determine the duration of the packet.

Figure 1:
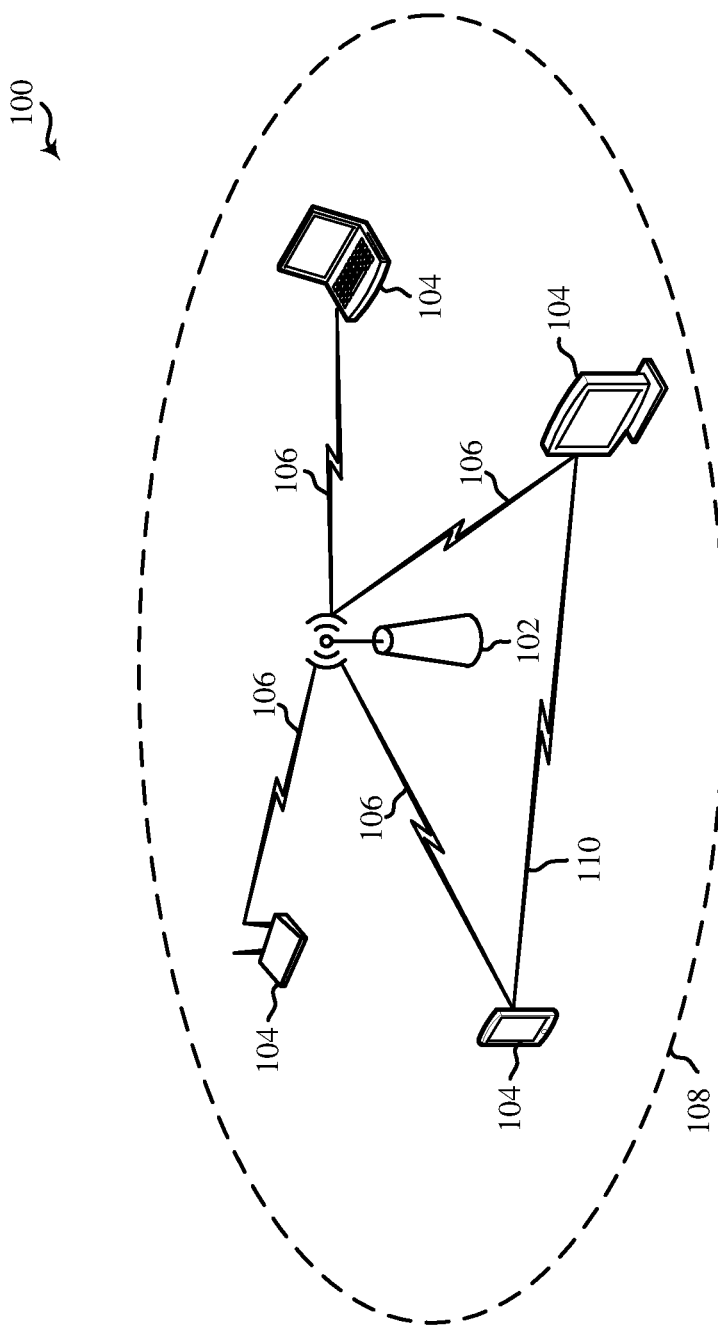
FIG. 1 shows a pictorial diagram of an example wireless communication network.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
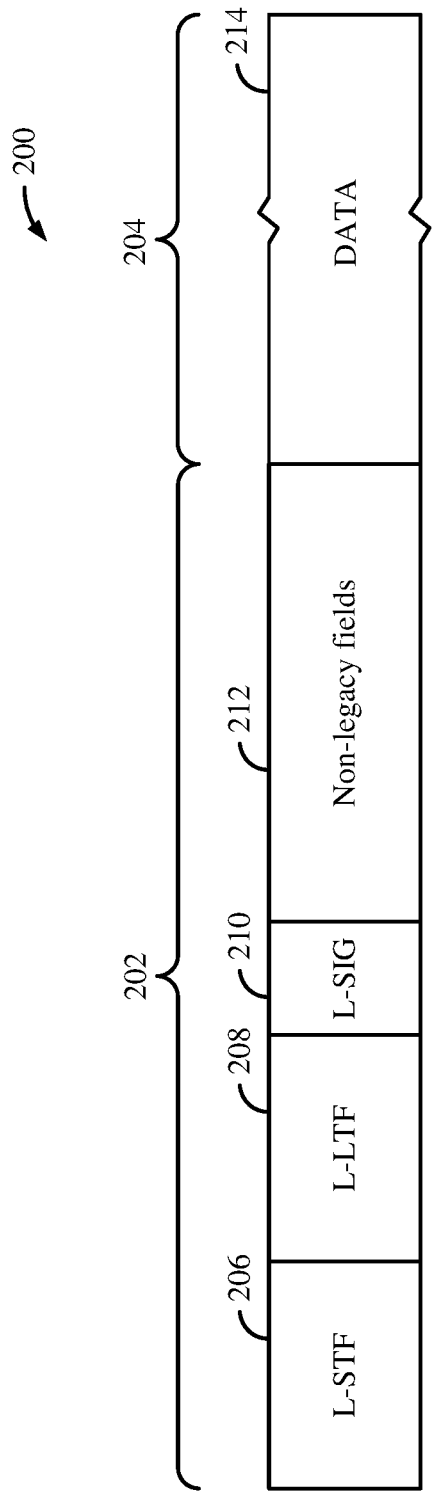
FIG. 2A shows an example protocol data unit (PDU) usable for communications between an access point (AP) and a number of stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
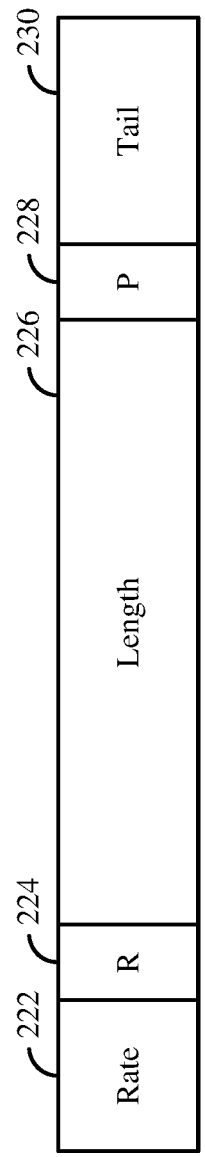
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
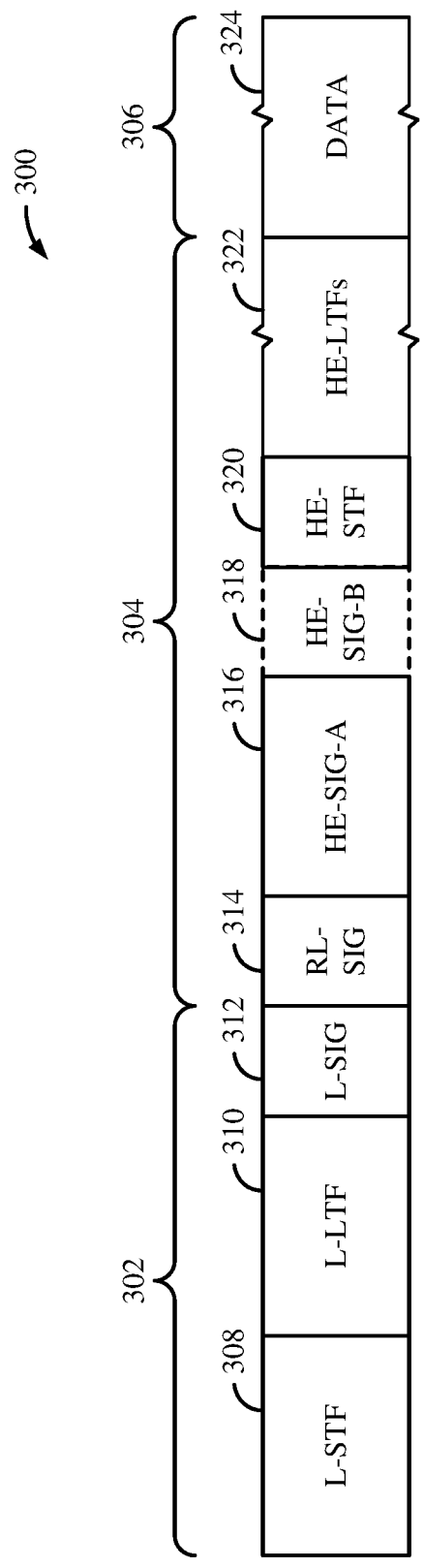
FIG. 3A shows an example PHY layer convergence protocol (PLCP) protocol data unit (PPDU) usable for communications between an AP and one or more STAs.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. HE-STF 320 may be used for timing and frequency tracking and AGC, and HE-LTF 322 may be used for more refined channel estimation. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
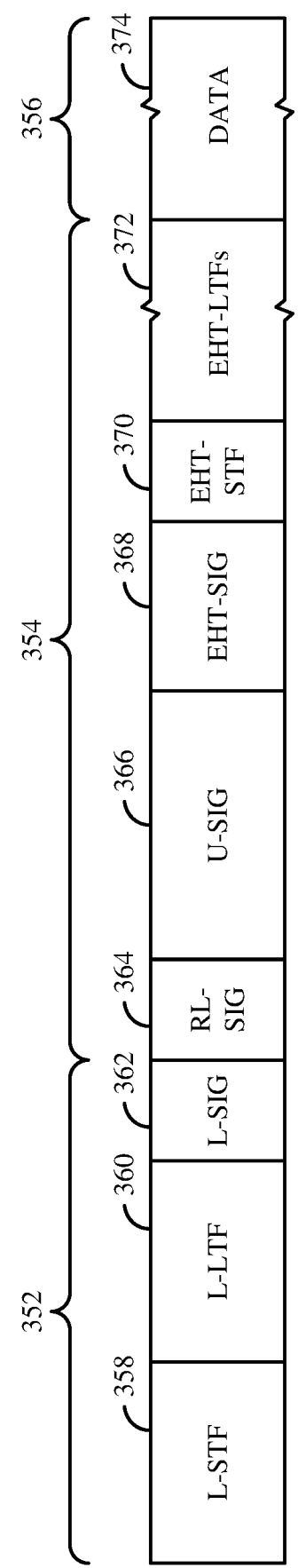
FIG. 3B shows another example PPDU usable for communications between an AP and one or more STAs.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation. Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 4:
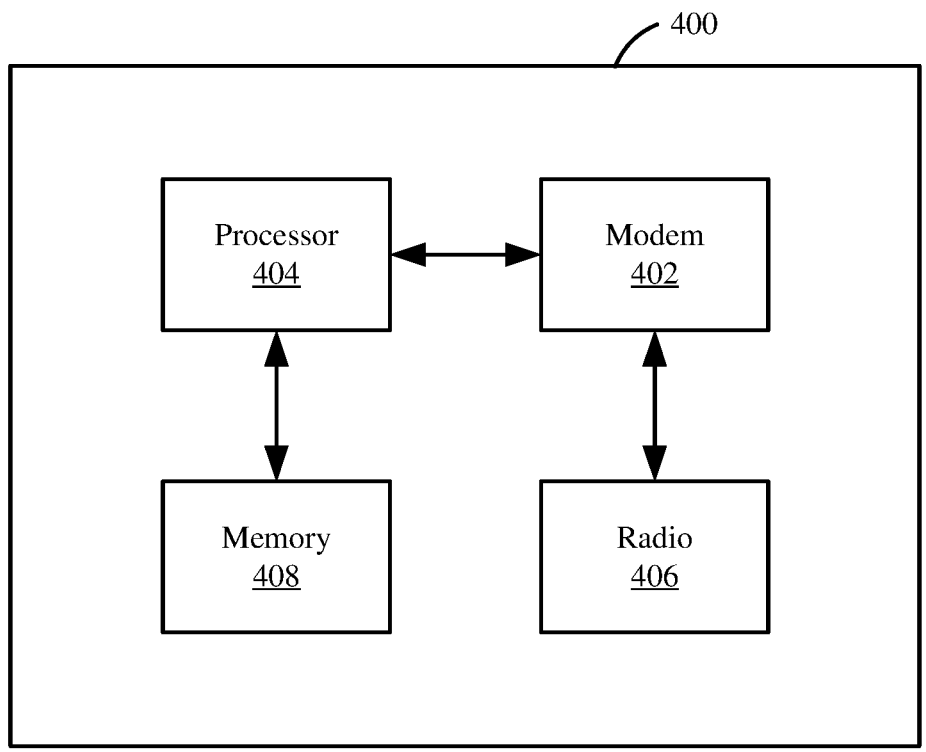
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some implementations, the wireless communication device 400 can be an example of a device for use in an AP such as the AP 102 described above with reference to FIG. 1. The wireless communication device 400 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more processors, processing blocks or processing elements 404 (collectively "the processor 404") coupled with the modem 402. In some implementations, the wireless communication device 400 additionally includes one or more radios 406 (collectively "the radio 406") coupled with the modem 402. In some implementations, the wireless communication device 400 further includes one or more memory blocks or elements 408 (collectively "the memory 408") coupled with the processor 404 or the modem 402.

The modem 402 can include an intelligent hardware block or device such as, for example, an application-specific integrated circuit (ASIC), among other examples. The modem 402 is generally configured to implement a PHY layer, and in some implementations, also a portion of a MAC layer (for example, a hardware portion of the MAC layer). For example, the modem 402 is configured to modulate packets and to output the modulated packets to the radio 406 for transmission over the wireless medium. The modem 402 is similarly configured to obtain modulated packets received by the radio 406 and to demodulate the packets to provide demodulated packets. In addition to a modulator and a demodulator, the modem 402 may further include digital signal processing (DSP) circuitry, automatic gain control (AGC) circuitry, a coder, a decoder, a multiplexer and a demultiplexer. For example, while in a transmission mode, data obtained from the processor 404 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 406. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 406, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 404) for processing, evaluation or interpretation.

The radio 406 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 406, which then transmits the symbols via the coupled antennas. Similarly, symbols received via the antennas are obtained by the radio 406, which then provides the symbols to the modem 402.

The processor 404 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 404 processes information received through the radio 406 and the modem 402, and processes information to be output through the modem 402 and the radio 406 for transmission through the wireless medium. For example, the processor 404 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 404 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 404, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
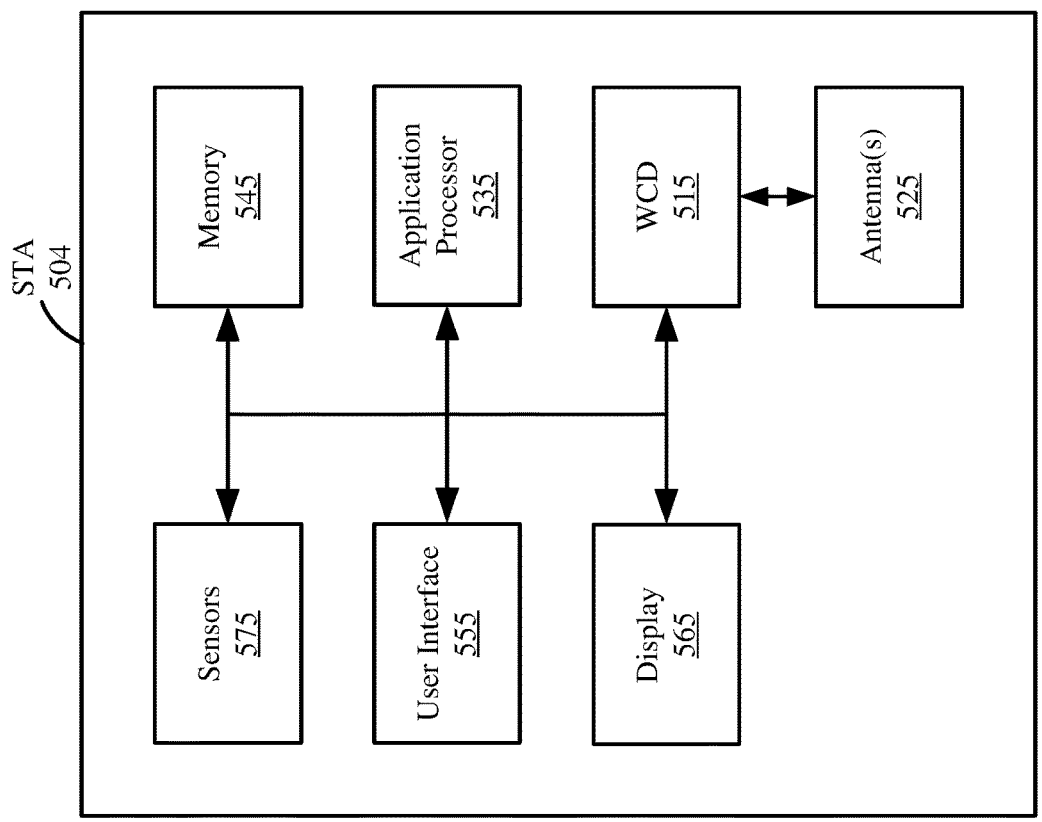
FIG. 5B shows a block diagram of an example station STA.
Figure 5A:
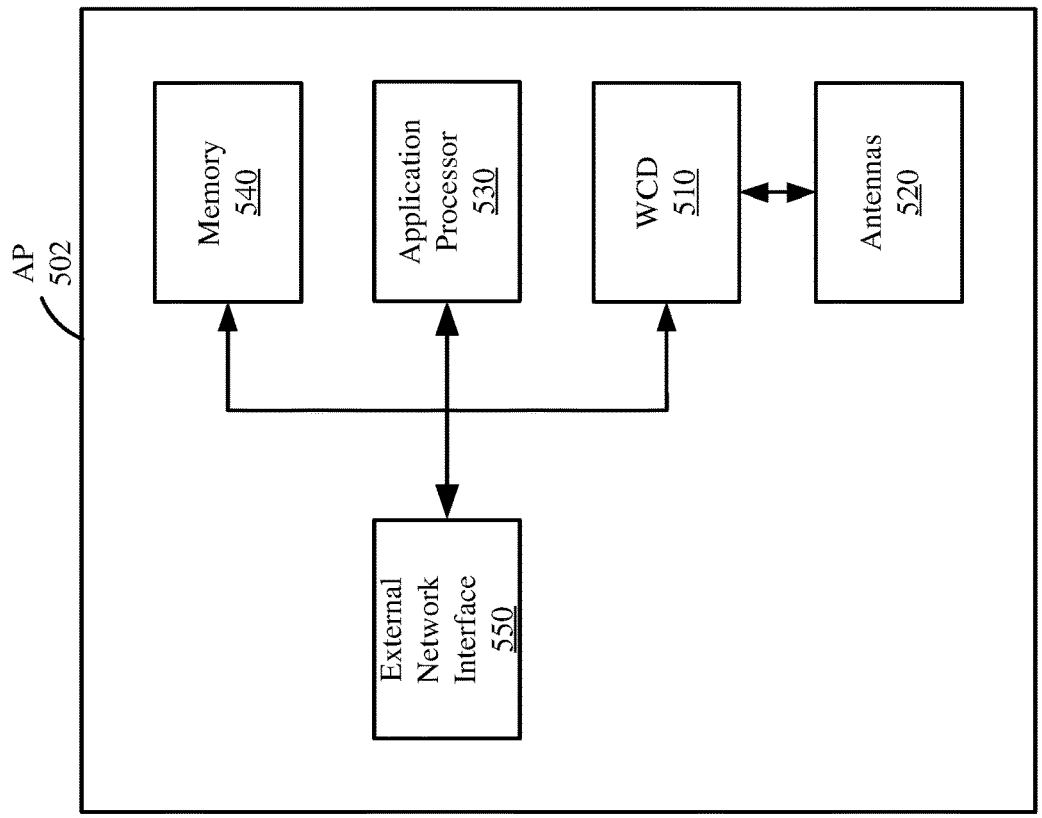
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 4000 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Transmitting and receiving devices may support the use of various modulation and coding schemes (MCSs) to transmit and receive data so as to optimally take advantage of wireless channel conditions, for example, to increase throughput, reduce latency, or enforce various quality of service (QoS) parameters. For example, existing technology supports the use of up to 1024-QAM and it is expected that 4096-QAM (also referred to as "4 k QAM") will also be implemented. 1024-QAM and 4096-QAM, among other MCSs, involve the use of low-density parity check (LDPC) encoding. For example, a PHY layer of the transmitting device may receive one or more MPDUs or A-MPDUs from a MAC layer of the transmitting device in the form of a PSDU. The PSDU may be arranged into multiple code blocks, each of which contains primary information (or "systematic information") representative of some or all of one or more of the MPDUs in the form of information bits. Some of the information bits (also referred to herein as "amplitude bits") in the code block are used to determine the amplitudes of the symbols to be modulated and transmitted to the receiving device. An LDPC encoding operation may be performed on the information bits in the code block to, for example, encode the data bits to add redundancy for forward error correction. Because LDPC encoding is an example of systematic encoding, the LDPC encoding operation does not change the data bits; rather, the amplitude bits output from the LDPC encoder are the same as the amplitude bits input to the LDPC encoder. In other words, the values of the amplitude bits used for the modulation come directly from the initial code block.

Real world wireless channels generally contain noise that imposes a limit on the maximum rate at which data can be communicated. The Shannon-Hartley theorem establishes an upper bound or limit (referred to as the "Shannon bound") that represents the absolute channel capacity of a link, that is, the maximum amount of error-free information per unit time that can be transmitted over a particular bandwidth in the presence of noise. Equation (1) below shows one representation of the Shannon-Hartley theorem.

$$C=B \log_2(1+SNR) \quad (1)$$

In Equation (1), C represents the channel capacity in bits per second, B represents the bandwidth in hertz, and SNR represents the signal-to-noise ratio defined as the ratio of the average received signal power to the average power of the noise and interference. Unfortunately, the channel capacity achievable with LDPC encoding shows a significant gap to the Shannon bound even for high MCSs. Additionally, to be able to use high MCSs, including 1024-QAM and 4096-QAM, high SNR is required, but it may be difficult to obtain the SNRs needed for such high MCSs.

This disclosure provides methods, devices and systems for encoding data for wireless communication to achieve a desired amplitude distribution. Some implementations more specifically relate to performing an encoding operation to shape the amplitudes of the resultant symbols such that the amplitudes have a non-uniform distribution. In some implementations of the non-uniform distribution, the probabilities associated with the respective amplitudes generally increase with decreasing amplitude. Some implementations enable the tracking of MPDU boundaries to facilitate successful decoding by a receiving device. Additionally or alternatively, some implementations enable the determination of a packet length after performing the amplitude shaping, which enables a transmitting device to determine the number of padding bits to add to the payload and to signal the packet length to a receiving device so that the receiving device may determine the duration of the packet.

Figure 6:
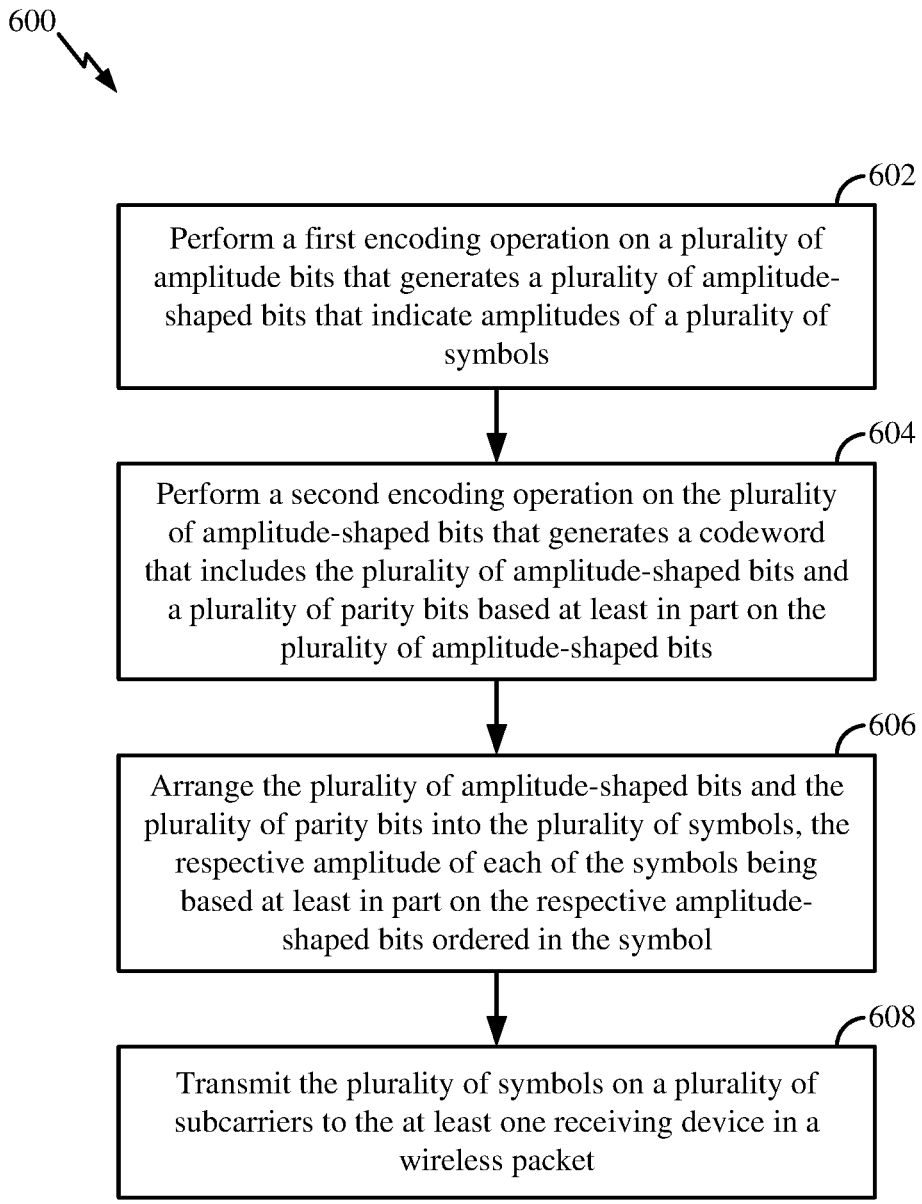
FIG. 6 shows a flowchart illustrating an example process for wireless communication that supports amplitude shaping according to some implementations.

FIG. 6 shows a flowchart illustrating an example process 600 for wireless communication that supports amplitude shaping according to some implementations. The operations of the process 600 may be implemented by a transmitting device or its components as described herein. For example, the process 600 may be performed by a wireless communication device such as the wireless communication device 400 described with reference to FIG. 4. In some implementations, the process 600 may be performed by a wireless communication device operating as or within an AP, such as one of the APs 102 and 502 described with reference to FIGS. 1 and 5A, respectively. In some other implementations, the process 600 may be performed by a wireless communication device operating as or within a STA, such as one of the STAs 104 and 504 described with reference to FIGS. 1 and 5B, respectively.

In block 602, the wireless communication device performs a first encoding operation on a plurality of amplitude bits that generates a plurality of amplitude-shaped bits that indicate amplitudes of a plurality of symbols. In some implementations, the first encoding operation encodes the plurality of amplitude bits to generate the plurality of amplitude-shaped bits such that the amplitudes of the resultant symbols have a non-uniform distribution. In block 604, the wireless communication device performs a second encoding operation on the plurality of amplitude-shaped bits that generates a codeword that includes the plurality of amplitude-shaped bits and a plurality of parity bits based at least in part on the plurality of amplitude-shaped bits. In block 606, the wireless communication device arranges the plurality of amplitude-shaped bits and the plurality of parity bits into the plurality of symbols, the respective amplitude of each of the symbols being based at least in part on the respective amplitude-shaped bits ordered in the symbol. In block 608, the wireless communication device transmits the plurality of symbols on a plurality of subcarriers to at least one receiving device in a wireless packet.

In some implementations, the performance of the first encoding operation (also referred to herein as an "amplitude-shaping encoding operation" or simply an "amplitude shaping operation") in block 602 encodes the plurality of amplitude bits to generate the plurality of amplitude-shaped bits such that the non-uniform distribution of the amplitudes of the symbols is a distribution in which the probabilities associated with the respective amplitudes generally increase with decreasing amplitude. For example, the non-uniform distribution may be approximately Gaussian centered around the center point (0,0) of the modulation constellation. As described above, such amplitude shaping may be used to increase the SNR and the channel capacity enabling greater throughput.

In some implementations, prior to performing the first encoding operation in block 602, a MAC layer of the wireless communication device generates an A-MPDU that includes a plurality of MPDUs. Each MPDU includes a plurality of data bits including a plurality of information bits (also referred to as "payload bits") as well as a plurality of control bits or a plurality of signaling bits (for example, MAC signaling bits). The first encoding operation may be performed in block 602 on all or a subset of the data bits in the MPDUs. For example, the information bits in each MPDU may be, or may include, a plurality of bits (amplitude bits) to be used for determining the amplitudes of the symbols. In some implementations, the first encoding operation may be performed in block 602 on only the amplitude bits. Additionally, in some implementations, to reduce complexity or because of the effective resultant coding rate, it may be sufficient or advantageous to perform the first encoding operation in block 602 on, for example, only the most significant bits (MSBs) of the amplitude bits (for example, if four bits are normally used to encode an amplitude component of a symbol, the number of MSBs may be three for each symbol). In such implementations, the first encoding operation is not performed on the remaining least significant bits (LSBs) of the amplitude bits.

Based on an MCS selected for transmission, the PHY layer may package the data bits in the MPDUs (either before or after performing the first encoding operation in block 602) into code blocks to be transmitted using M symbols. Each of the M symbols ultimately includes a set of n amplitude bits indicating at least one amplitude of the symbol. In some implementations, a first n/2 bits of the set of n amplitude bits for each symbol may indicate a first amplitude component of the amplitude of the symbol along a real axis of the modulation constellation, and a second n/2 bits of the set of n amplitude bits for each symbol of the M symbols may indicate a second amplitude component of the amplitude of the symbol along an imaginary axis of the modulation constellation. As such, there may be $2^{n/2}$ possible first amplitude levels for the first (real) amplitude component of each symbol, and $2^{n/2}$ possible second amplitude levels for the second (imaginary) amplitude component of each symbol.

Each of the M symbols may further include a sign bit for each of the amplitude components that indicates the sign of the respective amplitude. For example, when using QAM, a first sign bit of a pair of sign bits for each QAM symbol may indicate whether the respective first amplitude component along the real axis (the in-phase (i) component) is positive or negative, and the second sign bit of the pair of sign bits may indicate whether the respective second amplitude component along the imaginary axis (the quadrature (q) component) is positive or negative. As such, the first and the second amplitude components combine to provide the overall amplitude of the respective QAM symbol, and the first and the second sign bits combine to indicate the quadrant of the modulation constellation the overall amplitude lies in. For example, when using 1024-QAM, each symbol may include ten encoded bits in which a first four of the bits indicate the first (real) amplitude, another four of the bits indicate the second (imaginary) amplitude, another one of the bits indicates the sign (positive or negative) of the first amplitude, and another one of the bits indicates the sign (positive or negative) of the second amplitude.

Figure 7A:
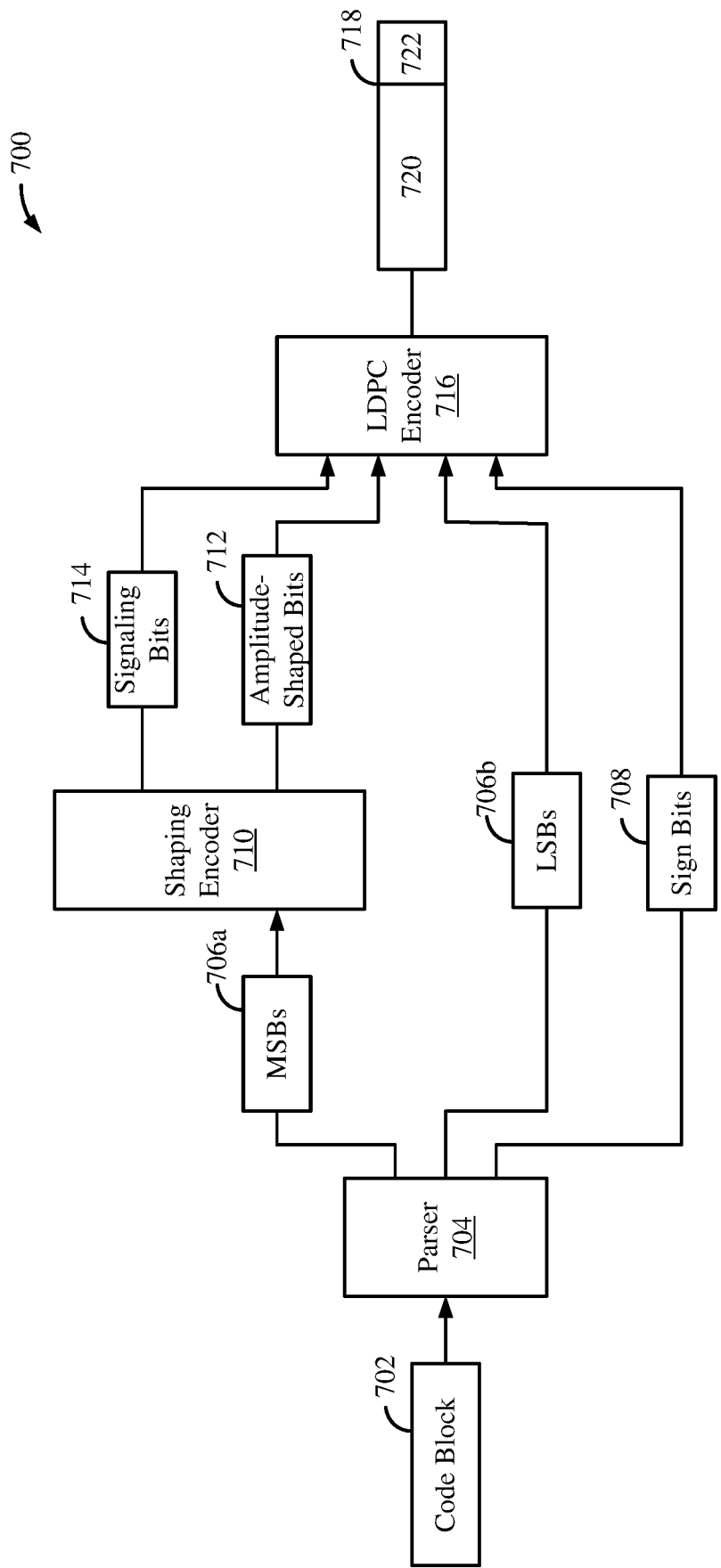
FIGS. 7A and 7B show a diagram of a flow that supports amplitude shaping according to some implementations.
Figure 7B:
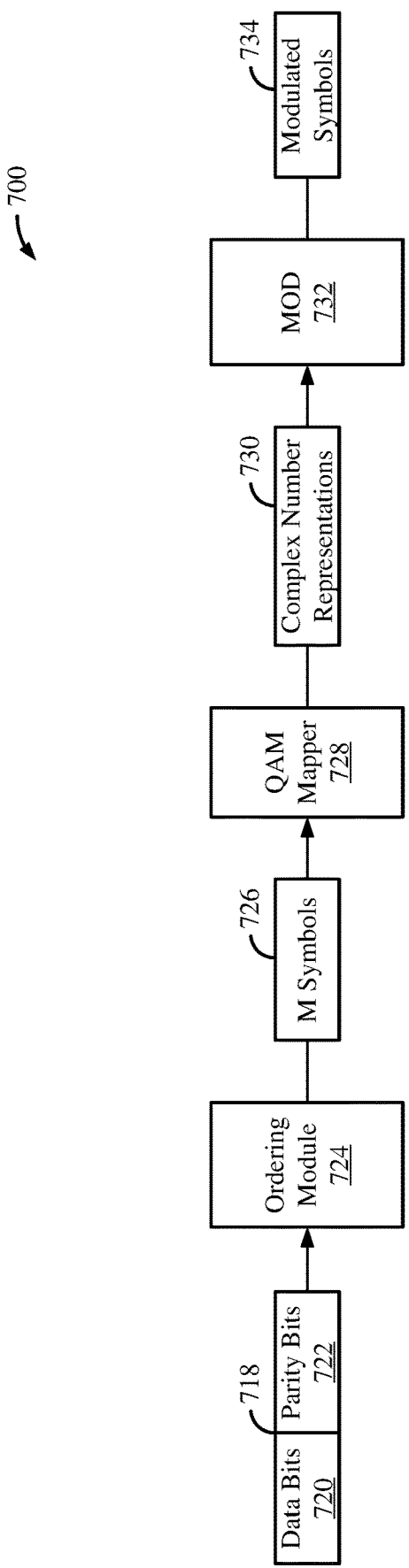

FIGS. 7A and 7B show a diagram of a flow 700 that supports amplitude shaping according to some implementations. For example, the flow 700 may illustrate aspects of the process 600. In the illustrated example, an information block 702 is provided to a pre-shaping parser 704 to obtain the plurality of amplitude bits on which a shaping encoder 710 will perform the first encoding operation in block 602. For example, the pre-shaping parser 704 may separate or divide amplitude bits 706 from sign bits 708 in the information block 702. In some implementations, the parser also separates or divides the amplitude bits into MSBs 706a and LSBs 706b. In some implementations, the plurality of amplitude bits provided to the shaping encoder 710 includes only the MSBs 706a of the amplitude bits 706. In some other implementations, the plurality of amplitude bits may include all of the amplitude bits 706. In the illustrated example, the shaping encoder 710 performs the first encoding operation on the MSBs 706a in block 602 to generate amplitude-shaped bits 712.

In some implementations, to perform the first encoding operation in block 602, and in particular, to obtain the set of n amplitude bits (eight in the 1024-QAM example) that indicate the first and the second amplitude components, the pre-shaping parser 704 (or the shaping encoder 710 itself) may further parse the plurality of amplitude bits (for example, the MSBs 706a) into a first stream of amplitude bits that will define the first amplitude components for the symbols when coded, and a second stream of amplitude bits that will define the second amplitude components for the symbols when coded. For example, in some implementations, a QAM flow is implemented via two independent pulse amplitude modulation (PAM) flows. In some such implementations, the shaping encoder 710 may perform the first encoding operation on the first stream of amplitude bits to provide a first PAM symbol stream in parallel with independently performing the first encoding operation on the second stream of amplitude bits to provide a second PAM symbol stream (which may ultimately be combined with the first PAM symbol stream to obtain a QAM symbol stream).

In some implementations, the performance of the first encoding operation in block 602 adds redundancy to the plurality of amplitude bits (the MSBs 706a in the example of FIGS. 7A and 7B) to generate the amplitude-shaped bits 712 such that the amplitude-shaped bits 712 include more bits than the plurality of amplitude bits input to the shaping encoder 710. By adding redundancy, the shaping encoder 710 may encode the MSBs 706a to generate the amplitude-shaped bits 712 such that the amplitudes of the associated symbols have a non-uniform distribution, and specifically, a distribution in which the probabilities associated with the respective amplitudes generally increase with decreasing amplitude, such as a Gaussian distribution.

In some implementations, the first encoding operation performed in block 602 is or includes an arithmetic encoding operation. In some such implementations, the performance of the arithmetic encoding operation in block 602 includes defining a first distribution of M first (real) amplitudes into $2^{b/2}$ bins, each bin being associated with a respective one of $2^{b/2}$ possible amplitude levels and having an associated size (for example, the size being equal to the number of instances of an amplitude of the respective amplitude level in the bin). Similarly, the performance of the arithmetic encoding operation also includes defining a second distribution of M second (imaginary) amplitudes into $2^{b/2}$ bins, each bin being associated with a respective one of $2^{b/2}$ possible amplitude levels and having an associated size (for example, the size being equal to the number of instances of an amplitude of the respective amplitude level in the bin). In such implementations, b equals n if the plurality of amplitude bits provided to the shaping encoder 706 includes all of the amplitude bits in the information block. However, if the plurality of amplitude bits comprises less than all of the data bits in the information block, for example, only the MSBs 706a of the amplitude bits 706, b may equal the number of MSBs of the n bits for each symbol (for example, for 1024-QAM, b may be equal to six when n is equal to eight such that three of the four amplitude bits for the real amplitude component are selected for the first encoding operation, and such that three of the four amplitude bits for the imaginary amplitude component are selected for the first encoding operation).

In some implementations, to achieve a non-uniform distribution of amplitudes, the sizes of the bins in the first distribution are initially not uniform, and the sizes of the bins in the second distribution are initially not uniform. To achieve a non-uniform distribution in which the probabilities associated with the respective amplitudes generally increase with decreasing amplitude, a size of at least a lowest bin of the bins in each of the first and the second distributions is configured to be greater than a size of at least a highest bin of the bins in the respective one of the first and the second distributions. However, during the arithmetic encoding operation performed in block 602, the sizes of the bins may dynamically change as amplitudes are selected from the bins.

The performance of the arithmetic encoding operation in block 602 includes, for each symbol of the M symbols, selecting, for the first amplitude component, a first (real) amplitude from one of the bins in the first distribution and selecting, for the second amplitude component, a second (imaginary) amplitude from one of the bins in the second distribution. For example, during the arithmetic encoding operation in block 602, the shaping encoder 710 may select, from the first distribution (and thus for the real amplitude component), either an upper half or a lower half of the distribution based on a value of a first bit of the first stream of amplitude bits. Similarly, the shaping encoder 710 may select, from the second distribution (and thus for the imaginary amplitude component), either an upper half or a lower half of the distribution based on a value of a first bit of the second stream of amplitude bits. In this way, each input data bit of a given one of the first and the second streams of amplitude bits defines a binary choice. In other words, the amplitude distribution associated with the respective amplitude component shrinks by a factor of two with each additional input data bit per symbol provided by the respective stream of amplitude bits.

In some other implementations, the first encoding operation performed in block 602 is or includes a prefix encoding operation. In some such implementations, the performance of the prefix encoding operation in block 602 includes, for each symbol of the M symbols, and for each of the first (real) and second (imaginary) amplitude components, comparing one or more patterns of a set of $2^{b/2}$ patterns of bit values of various lengths to bits of the plurality of amplitude bits input to the shaping encoder 710. Again, in such implementations, b equals n if the plurality of amplitude bits provided to the shaping encoder 706 includes all of the data bits in the code block. However, if the plurality of amplitude bits comprises less than all of the data bits in the code block, for example, only the MSBs 706a of the amplitude bits 706, b may equal the number of MSBs of the n bits for each symbol. Each of the patterns in the set of patterns may be associated with a respective amplitude level of the $2^{b/2}$ possible first (real) amplitude levels or the $2^{b/2}$ possible second (imaginary) amplitude levels. In this way, each of the amplitude levels is associated with a respective probability of occurrence associated with a probability mass function. In some implementations, the set of patterns and associated probability mass function are based on a Huffman algorithm. In some implementations, the probability mass function is dyadic, that is, all probabilities in the probability mass function are a negative power of 2.

For example, the shaping encoder 710 may input bits of the plurality of amplitude bits (for example, the MSBs 706a) into a look-up table (LUT) that includes the set of patterns that implement the probability mass function. In some such implementations, the shaping encoder 710 includes a first LUT for determining the first (real) amplitude components for the first PAM symbol stream based on the first stream of amplitude bits, and a second LUT for determining the second (imaginary) components for the second PAM symbol stream based on the second stream of amplitude bits. The first and the second LUTs may initially be identical in some implementations; however, as described below, the first and the second LUTs may each be independently, dynamically-adjusted or switched-out for a more desirable LUT as the prefix encoding operation progresses in block 602.

In some implementations, the performance of the prefix encoding operation in block 602 further includes identifying a match between bits of the plurality of amplitude bits (for example, the MSBs 706a) and one of the patterns. For example, the shaping encoder 710 may compare consecutive bits of the plurality of amplitude bits to the patterns in the LUT. Generally, with each additional data bit that is input to the LUT 900 and matched, the number of possible matching patterns decreases until only one of the patterns is remaining, which is then selected by the shaping encoder 710. In other words, the shaping encoder 710 may, in block 602, compare numbers of next consecutive input bits of the respective stream of amplitude bits with one, some or all of the respective patterns in the LUT. Responsive to finding a match, the shaping encoder 710 may output a set of b/2 amplitude-shaped bits 712 for the respective PAM symbol indicating the amplitude level associated with the respective pattern. In some implementations, the shaping encoder 710 may generally output an average number of amplitude-shaped bits 712 per PAM symbol as defined in Equation (2) below.

$$\text{\# of bits} = \sum_k -p_k \log_2 p_k$$

In Equation (2), $p_k$ is the probability associated with a respective number k of input data bits. For example, based on the probability mass function associated with the LUT, the number of amplitude-shaped bits 712 output per PAM symbol would be 2.6875 bits; that is, the effective coding rate to encode eight different amplitude levels would be reduced from the 3 typically required down to 2.6875 as a result of the amplitude shaping.

As described above, after performing the first encoding operation on the plurality of amplitude bits (for example, the MSBs 706a) in block 602 to generate the amplitude-shaped bits 712, a second encoding operation may then be performed on the amplitude-shaped bits 712 in block 604. For example, a second encoder 716 may receive a code block that includes the amplitude-shaped bits 712, and perform the second encoding operation in block 604 on the code block to generate a codeword 718 that includes a second plurality of coded data bits 720. In the illustrated example, the second encoder 716 performs the second encoding operation in block 604 on the amplitude-shaped bits 712 (based on the MSBs 706a) as well as on the LSBs 706b and the sign bits 708. Additionally, in implementations in which the shaping encoder generates signaling bits 714, such signaling bits may also be input to the second encoder 716 and encoded in the second encoding operation in block 604.

In some implementations, the second encoder 716 is a systematic encoder that performs a systematic encoding operation in block 604 such that the bits output from the second encoder 716 match those input to the second encoder. For example, in some such implementations, the second encoding operation performed is or includes a low-density parity check (LDPC) encoding operation (and as such, the second encoder 716 may hereinafter be referred to as the "LDPC encoder 716"). As such, the resultant second plurality of coded data bits 720 may include the amplitude-shaped bits 712, the LSBs 706b, the sign bits 708 and the signaling bits 714.

The performance of the LDPC encoding operation in block 604 adds redundancy to the data, for example, by generating a plurality of parity bits 722 based on the amplitude-shaped bits 712, the LSBs 706b, the sign bits 708 and the signaling bits 714. The parity bits 722 add redundancy to the data, for example, for forward error correction purposes, without changing the data. As such, for each code block input to the LDPC encoder 716, the resultant codeword 718 includes a systematic portion that contains the amplitude-shaped bits 712, the LSBs 706b, the sign bits 708 and the signaling bits 714 (collectively the second plurality of coded data bits 720), and a parity portion that contains the parity bits 722.

Upon performing the second encoding operation in block 604 to generate the codeword 718, the wireless communication device, in block 606, orders (or "arranges") the bits of the second plurality of coded data bits 720 and the plurality of parity bits 722 into M (for example, QAM) symbols 726 such that each symbol includes a set of n bits indicating an amplitude in the modulation constellation. For example, as shown in FIG. 7B, an ordering (or "reordering") module 724 may receive the codeword 718 and arrange bits from the amplitude-shaped bits 712, the LSBs 706b, the sign bits 708 and the parity bits 722 into the M symbols 726. In some such implementations, the ordering module 724 receives the amplitude-shaped bits 712, the LSBs 706b, the sign bits 708 and the parity bits 722 associated with both of the first and the second PAM symbol streams and reorders them into a single QAM symbol stream. In one 1024-QAM example in which each symbol 726 includes ten bits including n=8 amplitude bits of which b=6 are the MSBs, the ordering module 724 may take from the codeword 718, for each of the symbols 726, a set of three amplitude bits from the amplitude-shaped bits 712 encoded from the first stream of amplitude bits as well as an amplitude bit from the LSBs 706b associated with the first stream of amplitude bits in order to obtain the first (real) amplitude component. Similarly, the ordering module 724 may take from the codeword 718, for each of the symbols 726, a set of three amplitude bits from the amplitude-shaped bits 712 encoded from the second stream of amplitude bits as well as an amplitude bit from the LSBs 706b associated with the second stream of amplitude bits in order to obtain the second (imaginary) amplitude component.

As described above, each of the symbols 726 may further include a pair of sign bits indicating one of the four quadrants in the modulation constellation in which the amplitude is located. In some implementations, the ordering module 724 may attempt to take all of the sign bits needed for the symbols 726 from the parity bits 722. As described above, because the sign bits do not impact the power, it may be generally satisfactory to perform the amplitude shaping operation on only the amplitude bits 706, and in some implementations, only the MSBs 706a. For example, based on the selected MCS, the shaping encoder 710 is aware, on a code-block basis, how many parity bits will be generated by the LDPC encoder 716. As such, the shaping encoder 710 will know if some data bits will need to be used for sign bits in advance of the first encoding operation. For example, depending on the LDPC coding rate and QAM constellation size, it may be possible that all of the parity bits 722, as well as some unshaped data bits (for example, the sign bits 708), are used as sign bits in the symbols 726. This may be desirable because it means that the amplitudes of all of the M symbols 726 can be shaped. If dedicated sign bits 708 are necessary, they may be parsed from the rest of the code block prior to the first encoding operation and passed directly to the LDPC encoder 716 as described above. Alternatively, it may be possible that some parity bits 722 must be used as amplitude bits for the symbols 726 because the number of parity bits 722 is greater than the number of sign bits needed for the symbols 726. In such instances, the shaping encoder 710 may not be capable of performing the first encoding operation on, and thereby amplitude shaping, all amplitude components for all of the symbols 726 in block 602. As such, the achievable SNR gain may be reduced.

In block 608, the wireless communication device transmits the M symbols 726 on a plurality of subcarriers to the receiving device in a wireless packet. In some implementations, to transmit each of the symbols 726 in block 610, a constellation mapper (for example, a QAM mapper) 728 maps each of the symbols 726 to a point in a (for example, QAM) modulation constellation to obtain, for example, complex number representations 730 indicating the amplitudes and phases of the symbols 726. In some implementations, the constellation mapper 728 includes a plurality of constellation mappers, one for each of a plurality of streams of the symbols 726.

In some implementations, the ordering module 724 also may include a spatial stream parser that parses the symbols 726 into a plurality of spatial streams. In some such implementations, the spatial stream parser parses the amplitude-shaped bits 712, the LSBs 706b, the sign bits 708 and the parity bits 722 separately for each of the spatial streams to ensure that the bits are properly arranged into the symbols in the different spatial streams. In some implementations, the ordering module 724 additionally includes a plurality of bandwidth segment parsers that parse the symbols 726 from the spatial streams into different bandwidth segments (for example, different 80 MHz subchannels of a 160 MHz or 320 MHz bonded channel). After spatial stream parsing and bandwidth segment parsing (if performed), each of the different streams of parsed symbols 726 may be provided to a respective one of the constellation mappers that maps the symbols to points in the modulation constellation to obtain a respective stream of complex number representations 730.

A modulator 732 may then modulate the subcarriers of the bandwidth segments of the wireless channel based on the amplitudes and phases indicated by the complex number representations 730 to generate modulated symbols 734, which are then transmitted to the receiving device via coupled transmit chains and antennas. For example, continuing the example presented above, after the constellation mapping, the streams of complex number representations 730 may be provided to respective tone mappers of the modulator 732 that map the complex number representations to respective subcarriers (or "tones") of the wireless channel. In some implementations, the modulator 732 further includes a bandwidth segment deparser that deparses the different bandwidth segment streams to a plurality of spatial streams of symbols. The spatial streams may then be provided to a spatial multiplexer that performs spatial mapping on the symbols. The spatially-mapped streams may then be provided to a transform block that performs, for example, an inverse discrete Fourier transform on the symbols in the respective streams. The resultant symbols may then be provided to an analog and RF block for transmission. In some implementations, to ensure a uniform average transmission power, the analog and RF block may apply a power scaling factor to the modulated symbols 734 in block 608 prior to transmission over the wireless channel based on an amount of amplitude shaping performed in the first encoding operation.

In some implementations, the wireless communication device may, in the same wireless packet that includes the modulated symbols 734, also transmit an indication of the first encoding operation to the receiving device in block 608. For example, the wireless communication device may transmit the indication in a preamble of the wireless packet such as in a signaling field (for example, in an EHT-SIG field). In some such implementations, the wireless communication device may transmit an MCS field (which may be in an EHT-SIG) in the preamble of the packet that indicates a coding rate (for example, an LDPC coding rate) used in performing the second encoding operation in block 604, a modulation (for example, QAM) constellation size, and one or more indications of the first encoding operation. In some other implementations, the one or more indications of the first encoding operation may be transmitted in a second signaling field separate from the MCS field (for example, in another subfield within EHT-SIG). In some implementations, the MCS field or the second signaling field also includes an indication of the power scaling factor applied to the modulated symbols in block 608. In some implementations, the MCS field or the second signaling field may further indicate a size of the code block (or indications of the sizes and numbers of code blocks for a group of code blocks) input to the shaping encoder 710 on which the first encoding operation was performed in block 602. In some other implementations, one or both of the power scaling factor and the code block size may be signaled implicitly.

To indicate the first encoding operation, the MCS field or the second signaling field may include a first bit indicating whether the first encoding operation was performed and one or more second bits indicating one or more amplitude shaping parameters associated with the first encoding operation that define the non-uniform distribution of the amplitudes. In other words, the amplitude shaping parameters may define an amount of shaping or a probabilistic shaping rate associated with the amplitudes. For example, the amplitude shaping parameters may include an indication of the probability mass function associated with the first encoding operation for each MCS. In some specific examples, the amplitude shaping parameter may include information related to the sizes and amplitude levels associated with the bins used in an arithmetic encoding operation, or information related to the LUTs used in a prefix encoding operation. As described above, the MCS field or the second signaling field may also include signaling bits.

Figure 8:
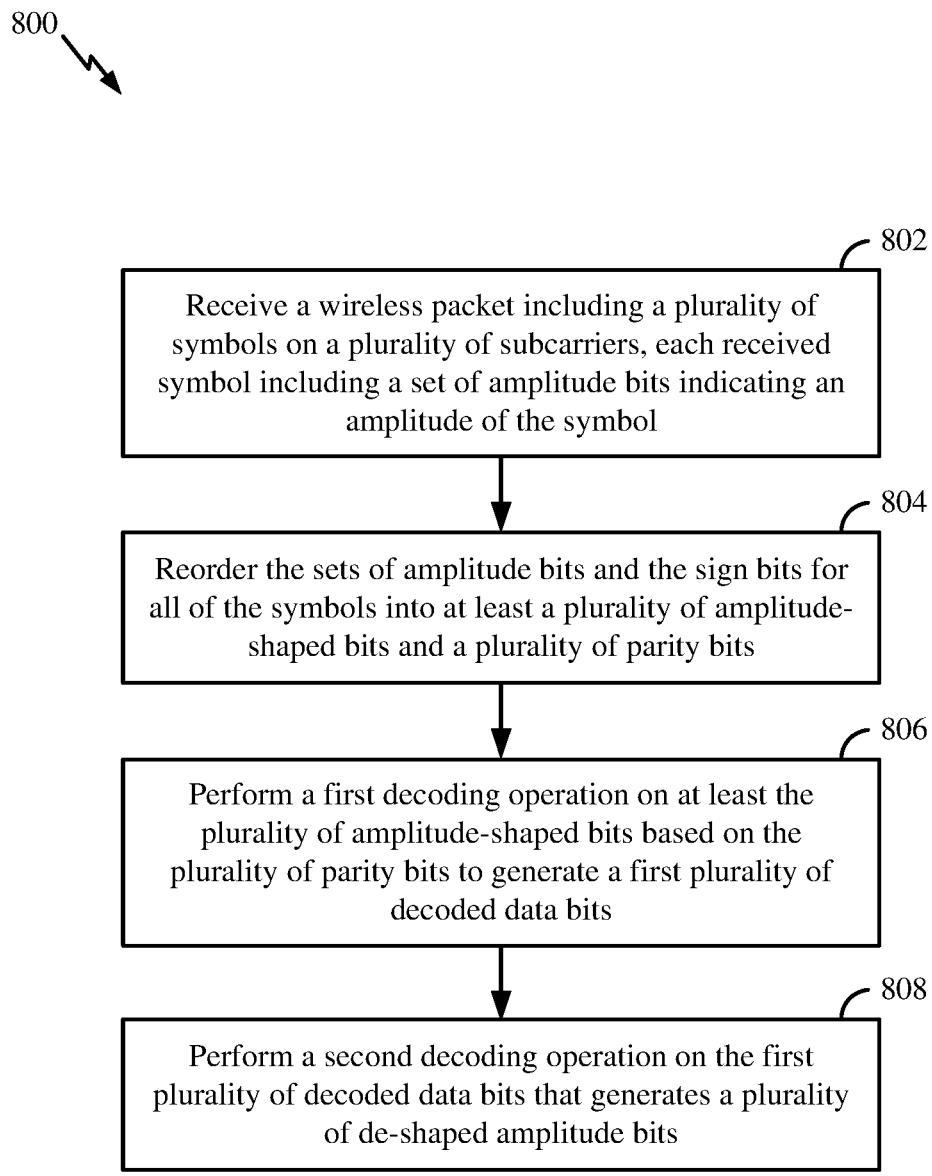
FIG. 8 shows a flowchart illustrating an example process for wireless communication that supports amplitude shaping according to some implementations.

FIG. 8 shows a flowchart illustrating an example process 800 for wireless communication that supports amplitude shaping according to some implementations. The operations of the process 800 may be implemented by a receiving device or its components as described herein. For example, the process 800 may be performed by a wireless communication device such as the wireless communication device 400 described with reference to FIG. 4. In some implementations, the process 800 may be performed by a wireless communication device operating as or within an AP, such as one of the APs 102 and 502 described with reference to FIGS. 1 and 5A, respectively. In some other implementations, the process 800 may be performed by a wireless communication device operating as or within a STA, such as one of the STAs 104 and 504 described with reference to FIGS. 1 and 5B, respectively.

In block 802, the wireless communication device receives a wireless packet including a plurality of modulated symbols on a plurality of subcarriers. Each received symbol includes a set of amplitude bits indicating an amplitude of the symbol. In some implementations, the amplitudes of the demodulated symbols have a non-uniform distribution. Each received symbol further includes at least one sign bit indicating a quadrant in a modulation constellation in which the respective amplitude is located. In block 804, the wireless communication device reorders the sets of amplitude bits and the sign bits for all of the symbols into at least a plurality of amplitude-shaped bits and a plurality of parity bits. In block 806, the wireless communication device performs a first decoding operation on at least the plurality of amplitude-shaped bits based on the plurality of parity bits to generate a first plurality of decoded data bits. In block 808, the wireless communication device performs a second decoding operation on the first plurality of decoded data bits that generates a plurality of de-shaped amplitude bits.

Figure 9A:
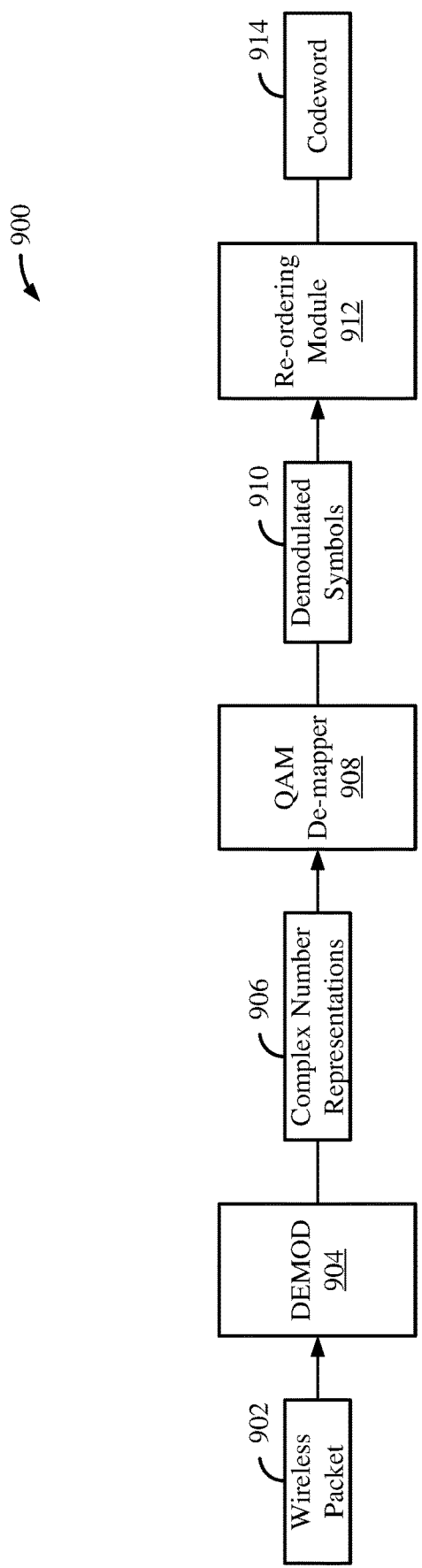
FIGS. 9A and 9B show a diagram of a flow that supports amplitude shaping according to some implementations.
Figure 9B:
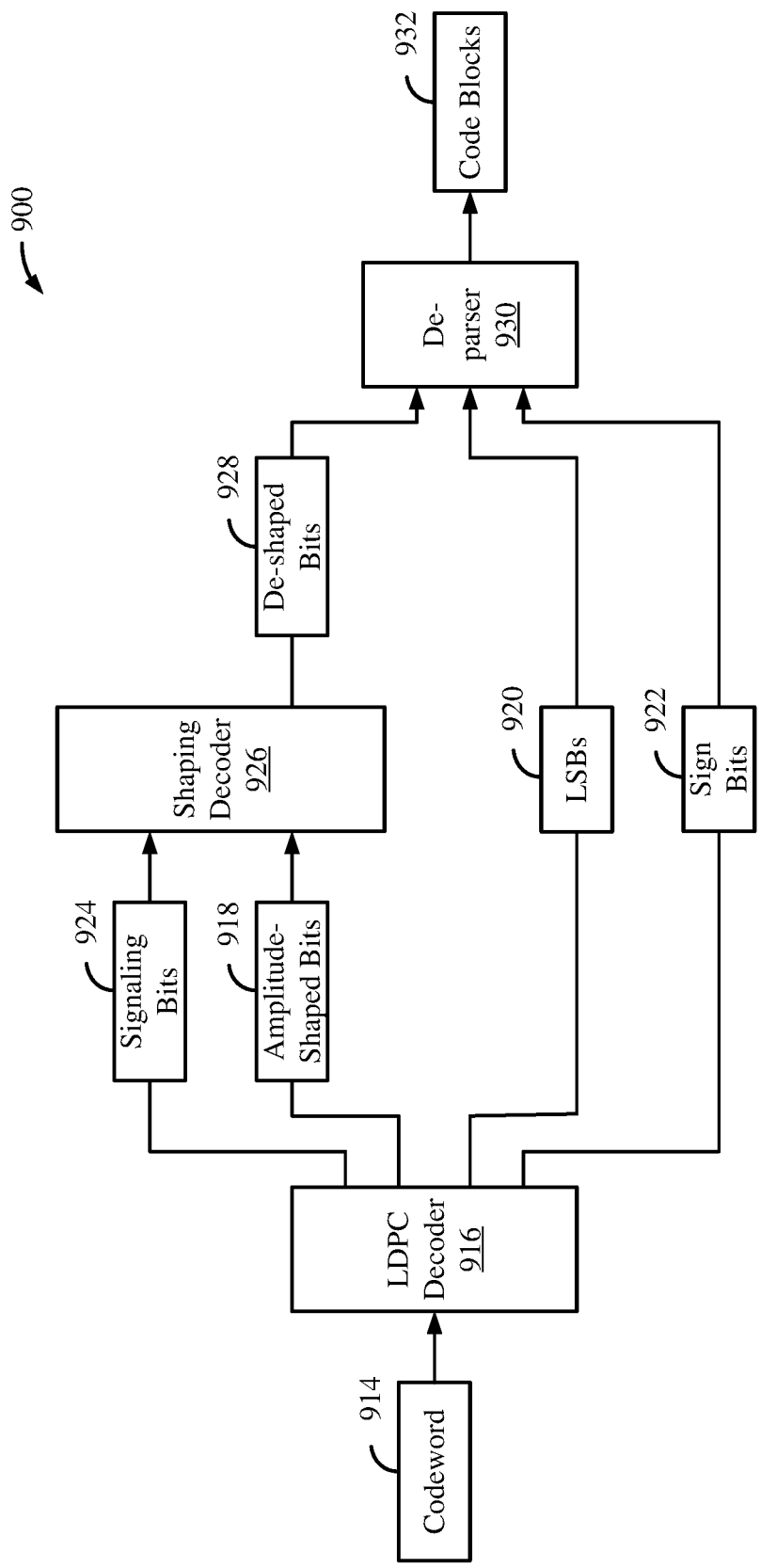

FIGS. 9A and 9B show a diagram of a flow 900 that supports amplitude shaping according to some implementations. For example, the flow 900 may illustrate aspects of the process 800. The process 800 and flow 900 are further presented below in relation to the process 600 and flow 700 described with reference to FIGS. 6 and 7. For example, in some implementations, the wireless communication device receives, in block 802, a wireless packet 902 including the plurality of modulated symbols 734 that were transmitted from the transmitting wireless communication device in block 608 of the process 600.

In some implementations, a demodulator 904 may receive the modulated symbols 734 via coupled antennas and receive chains and demodulate the subcarriers based on the detected amplitudes and phases in block 802 to generate demodulated symbols in the form of complex number representations 906 indicating the amplitudes and phases of the symbols, which are, ideally, identical to the complex number representations 730. For example, the demodulator 904 may include an analog and RF block that receives the wireless packet 902 and the modulated symbols over a plurality of spatial streams over a plurality of tones in one or more bandwidth segments via one or more coupled antennas. The received symbols may then be provided to a transform block of the demodulator 904 that performs, for example, a discrete Fourier transform on the symbols in the streams. In some implementations, the demodulator 732 further includes a bandwidth segment parser that parses the different bandwidth segment streams. A tone reverse-mapper of the demodulator 732 may then reverse-map the tones to obtain a plurality of spatial streams for each of the bandwidth segments (if present).

A constellation reverse-mapper (for example, a QAM reverse-mapper) 908 may then reverse map the complex number representations 906 from the respective points in the (for example, QAM) modulation constellation to obtain the demodulated symbols 910. For example, continuing the example presented above, the resultant streams of complex number representations 906 may be provided to respective constellation de-mappers that provide respective spatial streams of the demodulated symbols 910. Each of the demodulated symbols 910 ultimately includes a set of n amplitude bits indicating an amplitude of the symbol. As described above in conjunction with the process 600 and flow 700, a first n/2 bits of the set of n amplitude bits for each demodulated symbol 910 may indicate a first amplitude component of the amplitude of the symbol along a real axis of the modulation constellation, and a second n/2 bits of the set of n amplitude bits for each demodulated symbol 910 may indicate a second amplitude component of the amplitude of the symbol along an imaginary axis of the modulation constellation. As such, there are $2^{n/2}$ possible first amplitude levels for the first (real) amplitude component and $2^{n/2}$ possible second amplitude levels for the second (imaginary) amplitude component of each demodulated symbol 910. As described above, each of the demodulated symbols 910 may further include a sign bit for each of the amplitude components that indicates the sign of the respective amplitude.

As described above, in block 804, the wireless communication device reorders the sets of amplitude bits and the sign bits for all of the symbols into at least a plurality of amplitude-shaped bits and a plurality of parity bits. For example, the amplitude-shaped bits may include the MSBs 706a. In some such examples, the sets of amplitude bits may further include a plurality of unshaped bits, for example, including the LSBs 708. In some implementations, the demodulated symbols 910 may further include a plurality of sign bits or signaling bits. In some implementations, a reordering module 912 may receive the demodulated symbols 910 including all of the amplitude bits (including the amplitude-shaped bits and any unshaped bits) and the parity bits and reassemble them into a codeword 914. For example, continuing the example presented above, the reordering module 912 may also include a plurality of bandwidth segment deparsers that deparse the symbols 910 from the respective bandwidth segment streams. In some implementations, the reordering module 912 also may include a spatial stream deparser that deparses the symbols in the resultant spatial streams into a single stream of bits. As described above, the reordering module 912 may then reorder the bits from the demodulated symbols into the codeword 914.

As described above, in block 806, the wireless communication device performs a first decoding operation on at least the plurality of amplitude-shaped bits based on the plurality of parity bits to generate a first plurality of decoded data bits. For example, as shown in FIG. 9B, a first decoder 916 may receive the codeword 914 and perform the first decoding operation on the codeword 914 in block 808 to provide at least a first plurality of decoded data bits based on the amplitude-shaped bits. The first decoder 916 may be a systematic decoder (for example, an LDPC decoder) that attempts to decode the amplitude bits with the aid of the parity bits. As described above, the codeword 914 may also include unshaped amplitude bits (for example, LSBs or sign bits). As such, based on the decoding of the codeword 914, the first decoder 916 may output a decoded code block including decoded amplitude-shaped bits (for example, MSBs) 918, decoded LSBs 920, decoded sign bits 922 and decoded signaling bits 924.

As described above, the wireless communication device performs a second decoding operation in block 808 on the amplitude-shaped bits 918 to generate de-shaped amplitude bits. In some implementations, a shaping decoder 926 performs the second decoding operation (also referred to herein as the "amplitude de-shaping operation") to remove redundancy from the amplitude-shaped bits 918 to generate the de-shaped amplitude bits 928 such that the number (numerical quantity) of de-shaped amplitude bits 928 is less than the number of amplitude-shaped bits 918. In some implementations in which the plurality of decoded data bits includes unshaped bits (for examples, LSBs 920, sign bits 922 or signaling bits 924), the second decoding operation is performed on only the amplitude-shaped bits 918 in block 808. The amplitude de-shaping operation undoes the corresponding amplitude-shaping operation that was performed at the transmitting device such that the amplitudes associated with the respective symbols are reverted to a substantially uniform distribution.

In some implementations, the second decoding operation performed in block 808 is or includes an arithmetic decoding operation. For example, the shaping decoder 926 may perform an arithmetic decoding operation in block 808 that is essentially the inverse of the arithmetic encoding operation described with reference to block 602 of the process 600. In some other implementations, the second decoding operation performed in block 808 is or includes a prefix decoding operation. For example, the shaping decoder 926 may perform a prefix decoding operation in block 808 that is essentially the inverse of the prefix encoding operation described with reference to block 602 of the process 600. As described above, in some implementations, the performance of the prefix decoding operation can be parallelized.

In the illustrated example, a deparser 930 reassembles the de-shaped bits (for example, the MSBs) 928 and any LSBs 920 or sign bits 922 into one or more information blocks 932. The information blocks 932 may then be processed by the MAC layer of the wireless communication device to decode corresponding MPDUs.

Figure 10A:
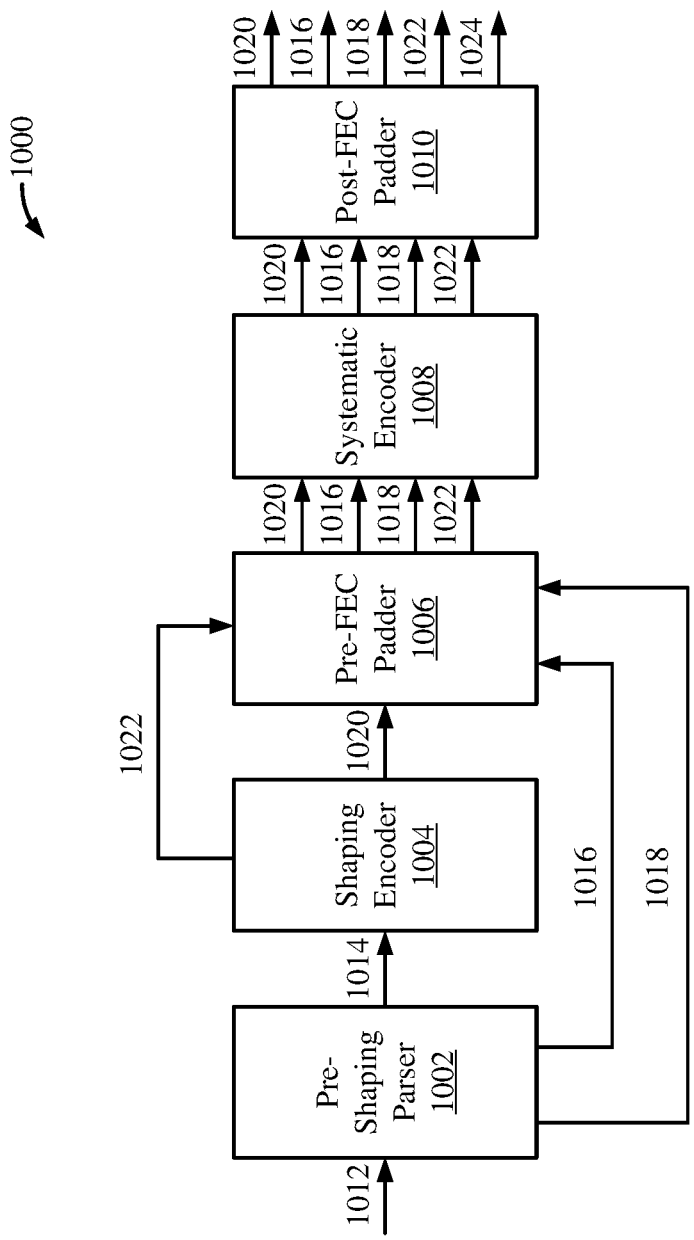
FIG. 10A shows an example wireless communication device that supports amplitude shaping according to some implementations.

In some implementations, amplitude-shaping encoding operations and amplitude de-shaping decoding operations may be implemented by MAC layers of the transmitting and receiving devices, respectively. For example, FIG. 10A shows an example wireless communication device 1000 that supports amplitude shaping according to some implementations. The wireless communication device 1000 includes a pre-shaping parser 1002, a shaping encoder 1004, a pre-forward-error-correction (pre-FEC) PHY padder 1006, a systematic encoder 1008, and a post-FEC PHY padder 1010. In the illustrated example, the pre-shaping parser 1002 and the shaping encoder 1004 are implemented by the MAC layer of the transmitting device. The pre-FEC PHY padder 1006, the systematic encoder 1008 and the post-FEC PHY padder 1010 may be implemented by the PHY layer of the transmitting device.

The pre-shaping parser 1002 receives an information block 1012. For example, the pre-shaping parser 1002 may receive the information block 1012 in the form of an A-MPDU that includes a plurality of MPDUs. In some implementations, the pre-shaping parser 1002 may implement aspects of the pre-shaping parser 704 described with reference to FIG. 7A. As described above, each MPDU includes a plurality of data bits including a plurality of information bits (payload bits) as well as a plurality of control bits or a plurality of signaling bits. For example, the information bits in each MPDU may be, or may include, a plurality of bits (amplitude bits) to be used for determining the amplitudes of the symbols. The data bits in each MPDU may also include a plurality of bits (sign bits) to be used for determining the respective quadrants the amplitudes of the symbols are located in in the modulation constellation. In some implementations, the sign bits or LSBs of the amplitude bits include control bits or signaling bits representative of portions of the MPDUs that contain control information or MAC signaling information. For example, the control bits or signaling bits may include the bits that convey the MPDU delimiters, MPDU headers, frame check sequences (FCSs) and padding bits in each MPDU, or the MAC destination addresses, MAC source addresses, lengths and padding bits in the MSDUs within the MPDUs.

The pre-shaping parser 1002 may parse the bits in the information block 1012 into bits that are to be shaped by the shaping encoder 1004 and bits that are not to be shaped by the shaping encoder 1004. For example, the pre-shaping parser 1002 may separate or divide the bits in the information block 1012 into MSBs 1014, LSBs 1016 and sign bits 1018. In some implementations, the amplitude-shaping encoding operation is only performed on the MSBs 1014 and not performed on the LSBs 1016 or the sign bits 1018, for example, because the sign bits do not affect the resultant transmit power and the LSBs may have relatively less of an effect on the transmit power. In some implementations, the amplitude-shaping encoding operation is not performed on other information bits, the control bits or the signaling bits, for example, to preserve the control or signaling information and to facilitate decoding by the receiving device.

In some implementations, the number $N_{shaped}$ of bits to be parsed and input to the shaping encoder 1004 for amplitude-shaping encoding may be calculated according to Equation (3) below.

$$N_{shaped} = \frac{8*\text{APEP\_LENGTH} + N_{tail} + N_{service} + N_{PAD,Pre-FEC}}{\frac{R_{LDPC}N_{bpscs} - 2*N_{MSB}}{R_{shaper}*2*N_{MSB}} + 1}$$

In Equation (3), $N_{tail}$ is the number of tail bits added by the MAC layer (which may be zero in implementations that employ LDPC encoding for the second encoding operation), $N_{service}$ is the number of service bits added by the MAC layer, $N_{PAD,pre-FEC}$ is the number of padding bits added by the MAC layer, $R_{LDPC}$ is the coding rate of the second encoder (for example, an LDPC encoder), $N_{bpscs}$ is the number of bits per subcarrier per stream, $N_{MSB}$ is the number of MSBs used for each of the real and imaginary components of the amplitudes, $R_{shaper}$ is the coding rate of the shaping encoder, and APEP_LENGTH is the initial payload length calculated by the MAC layer. In some implementations, $N_{PAD,pre-FEC}$ is assumed to be zero in an initial determination of $N_{shaped}$ to calculate the number of pre-FEC padding bits to be added.

As described above, in the illustrated example, only the MSBs 1014 are provided to the shaping encoder 1004 for the performance of the amplitude-shaping encoding operation. The shaping encoder 1006 performs the amplitude-shaping encoding operation on the MSBs 1014 to generate amplitude-shaped bits 1020. In some implementations, the shaping encoder 1004 may implement aspects of the shaping encoder 710 described with reference to FIG. 7A. As described above, in some implementations, the shaping encoder 1004 adds redundancy to the MSBs 1014 to generate the amplitude-shaped bits 1020 such that the amplitude-shaped bits 1020 include more bits than the MSBs 1014 input to the shaping encoder 1004. By adding redundancy, the shaping encoder 1004 may encode the MSBs 1014 to generate the amplitude-shaped bits 1020 such that the amplitudes of the associated symbols have a non-uniform distribution, and specifically, a distribution in which the probabilities associated with the respective amplitudes generally increase with decreasing amplitude, such as a Gaussian distribution.

The number of amplitude-shaped bits output from the shaping encoder 1004 may be given by Equation (4) below.

$$\text{Number of output bits} = \frac{N_{shaped}}{R_{shaper}} + N_{signaling}$$

In Equation (4), $N_{signaling}$ is the number of signaling bits output from the shaping encoder. For example, in some implementations, the pre-shaping parser 1002 or other module of the MAC layer also generates signaling bits that are then provided to the PHY layer with the MSBs 1014, the LSBs 1016 and the sign bits 1018 to inform the PHY layer how the bits in the information block 1012 were parsed. For example, this enables the PHY layer to properly arrange the bits into symbols and perform constellation mapping as described below.

As described above, in some implementations, the amplitude-shaping encoding operation is or includes an arithmetic encoding operation. For example, the shaping encoder 1004 may be configured to perform an arithmetic encoding operation such as the arithmetic encoding operation described with reference to block 602 of the process 600 of FIG. 6 and the flow 700 of FIG. 7A. In some other implementations, the amplitude-shaping encoding operation is or includes a prefix encoding operation. For example, the shaping encoder 1004 may be configured to perform a prefix encoding operation such as the prefix encoding operation described with reference to block 602 of the process 600 of FIG. 6 and the flow 700 of FIG. 7A. As described above, the shaping encoder 1004 may output signaling bits 1022 indicating the amplitude-shaping encoding operation that was performed, including signaling bits indicating amplitude-shaping encoding parameters that define the non-uniform distribution of the amplitudes or a scrambling sequence or scrambling operation used for the amplitude-shaping encoding operation. The signaling bits indicating the parameters may ultimately be encoded and transmitted to the receiving device in, for example, an MCS field or another field (such as an EHT-SIG) in a preamble of the wireless packet that will contain the symbols.

The MAC layer may then pass the amplitude-shaped bits 1020, the LSBs 1016, the sign bits 1018 and the signaling bits 1022 to the PHY layer of the transmitting device. For example, the pre-FEC PHY padder 1006 may receive one or more information blocks in the form of a PSDU that includes the amplitude-shaped bits 1020, the LSBs 1016, the sign bits 1018 and the signaling bits 1022. The pre-FEC PHY padder 1006 then adds padding bits. Because physical layer wireless communications are transmitted as modulated symbols, the lengths of physical layer wireless transmissions are quantized in units of symbols. As such, the pre-FEC PHY padder 1006 adds pre-FEC padding bits prior to the provision of the amplitude-shaped bits 1020, the LSBs 1016, the sign bits 1018 and the signaling bits 1022 to the systematic encoder 1008 for systematic encoding to ensure that the systematic encoder receives the proper number of bits to produce an integer number of symbols. In some instances, the pre-FEC padding bits may themselves be used as amplitude bits or sign bits. For example, the pre-FEC padding bits may be subsequently included in the sign bits 1018.

The systematic encoder 1008 receives the amplitude-shaped bits 1020, the LSBs 1016, the sign bits 1018 and the signaling bits 1022, and performs a systematic encoding operation on the bits to generate a codeword. In some implementations, the systematic encoder 1008 may implement aspects of the systematic encoder 716 described with reference to FIG. 7A. As described above, in some implementations, the performance of the systematic encoding operation encodes the amplitude-shaped bits 1020, the LSBs 1016, the sign bits 1018 and the signaling bits 1020 such that the codeword output from the systematic encoder 1008 also includes the amplitude-shaped bits 1020, the LSBs 1016, the sign bits 1018 and the signaling bits 1022 input to the systematic encoder. For example, in some such implementations, the systematic encoding operation is or includes an LDPC encoding operation. As described above, the performance of the systematic encoding operation adds redundancy to the data, for example, by generating a plurality of parity bits based on the amplitude-shaped bits 1020, the LSBs 1016, the sign bits 1018 and the signaling bits 1022. As is also described above, the parity bits may themselves be used as sign bits, and as such, may hereinafter also be included in the sign bits 1018.

The post-FEC PHY padder 1010 receives the codeword including the amplitude-shaped bits 1020, the LSBs 1016, the sign bits 1018 and the signaling bits 1022 and, for example, based on packet extension requirements, adds post-FEC padding bits 1024 to the codeword to satisfy the packet extension requirements. The amplitude-shaped bits 1020, the LSBs 1016, the sign bits 1018, the signaling bits 1022, and the post-FEC padding bits 1024 may then be arranged into a plurality of symbols as described with reference to block 606 of the process 600 of FIG. 6. For example, the amplitude-shaped bits 1020, the LSBs 1016, the sign bits 1018, the signaling bits 1022, and the post-FEC padding bits 1024 may be provided to an ordering module. In some implementations, the ordering module may implement aspects of the ordering module 724 described with reference to FIG. 7B.

As described above, in some implementations, the ordering module may include a spatial stream parser that parses the amplitude-shaped bits 1020, the LSBs 1016, the sign bits 1018, the signaling bits 1022, and the post-FEC padding bits 1024 into a plurality of spatial streams of symbols. In some such implementations, the spatial stream parser parses the amplitude-shaped bits 1020, the LSBs 1016, the sign bits 1018, the signaling bits 1022, and the post-FEC padding bits 1024 separately for each of the spatial streams to ensure that the bits are properly arranged into the symbols in the different spatial streams. In some implementations, the ordering module additionally includes a plurality of bandwidth segment parsers that parse the symbols from the spatial streams into different bandwidth segments.

The symbols may then be transmitted on a plurality of subcarriers to at least one receiving device in a wireless packet. For example, after spatial stream parsing and bandwidth segment parsing (if performed), each of the different streams of parsed symbols may be provided to a respective constellation mapper that maps the symbols to points in the modulation constellation to obtain a respective stream of complex number representations. For example, the constellation mappers may implement aspects of the constellation mapper 728 described with reference to FIG. 7B. A modulator may then modulate the subcarriers of the bandwidth segments of the wireless channel based on the amplitudes and phases indicated by the complex number representations to generate modulated symbols, which are then transmitted to the receiving device via coupled transmit chains and antennas. For example, the modulator may implement aspects of the modulator 732 described with reference to FIG. 7B, including a plurality of tone mappers, a bandwidth segment deparser, a spatial multiplexer, a transform block, and an analog and RF block.

In some implementations, the wireless communication device 1000 includes corresponding functionality for receiving and decoding modulated symbols. For example, the wireless communication device 1000 may include a post-FEC padding removal module, a systematic decoder, a pre-FEC padding removal module, a shaping decoder, and a post-deshaping deparser. In some such implementations, the shaping decoder and the post-de-shaping deparser are implemented by the MAC layer of the transmitting device. The post-FEC padding removal module, the systematic decoder, and the pre-FEC padding removal module may be implemented by the PHY layer of the transmitting device. In some implementations, the shaping decoder may implement aspects of the shaping decoder 926 described with reference to FIG. 9B. In some such implementations, the post-deshaping deparser may implement aspects of the post-de-shaping deparser 930 described with reference to FIG. 9B.

Figure 10B:
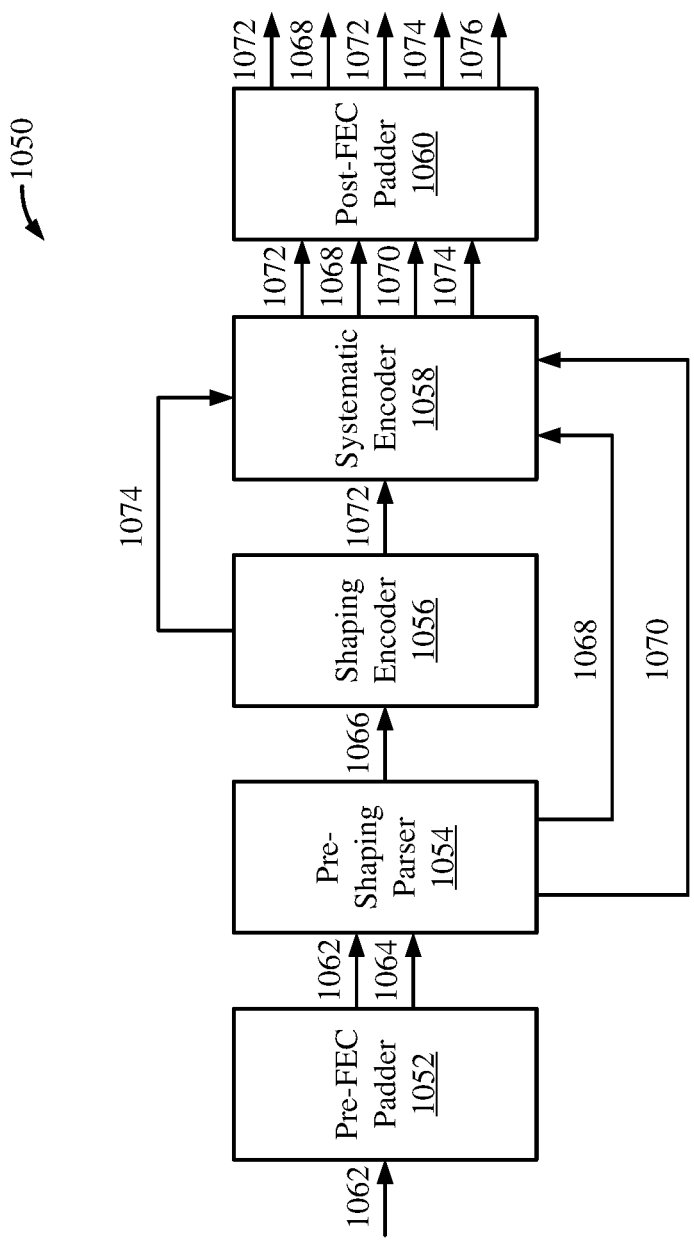
FIG. 10B shows an example wireless communication device that supports amplitude shaping according to some implementations.

In some other implementations, amplitude-shaping encoding operations and amplitude de-shaping decoding operations may be implemented by PHY layers of the transmitting and receiving devices, respectively. For example, FIG. 10B shows an example wireless communication device 1050 that supports amplitude shaping according to some implementations. The wireless communication device 1050 includes a pre-FEC PHY padder 1052, a pre-shaping parser 1054, a shaping encoder 1056, a systematic encoder 1058, and a post-FEC PHY padder 1060. Unlike in the wireless communication device 1000, the pre-shaping parser 1054 and the shaping encoder 1056 are implemented by the PHY layer of the transmitting device. The pre-FEC PHY padder 1052, the systematic encoder 1058 and the post-FEC PHY padder 1060 also may be implemented by the PHY layer of the transmitting device.

The pre-FEC PHY padder 1052 receives an information block 1062 from the MAC layer of the transmitting device. For example, the pre-FEC PHY padder 1052 may receive the information block 1062 in the form of a PSDU that includes information bits for a plurality of MPDUs of an A-MPDU. The pre-FEC PHY padder 1052 adds pre-FEC padding bits 1064 to the information block 1062. As described above, the pre-FEC PHY padder 1052 may add the pre-FEC padding bits 1064 prior to the amplitude-shaping encoding operation to ensure that the shaping encoder 1056 receives enough bits to produce an integer number of symbols.

The information block 1062 and the pre-FEC padding bits 1064 are then provided to the pre-shaping parser 1054. In some implementations, the pre-shaping parser 1054 may implement aspects of the pre-shaping parser 704 described with reference to FIG. 7A. The pre-shaping parser 1054 may parse the bits in the information block 1062 into bits that are to be shaped by the shaping encoder 1056 and bits that are not to be shaped by the shaping encoder 1056. For example, the pre-shaping parser 1054 may separate or divide the bits in the information block 1062 into MSBs 1066, LSBs 1068 and sign bits 1070. In some instances, the pre-FEC padding bits 1064 may themselves be used as amplitude bits or sign bits. For example, the pre-FEC padding bits may be subsequently included in the sign bits 1070.

In some implementations, the amplitude-shaping encoding operation is only performed on the MSBs 1066 and not performed on the LSBs 1068 or the sign bits 1070, for example, because the sign bits do not affect the resultant transmit power and the LSBs may have relatively less of an effect on the transmit power. In some implementations, the amplitude-shaping encoding operation is not performed on other information bits, the control bits or the signaling bits, for example, to preserve the control or signaling information and to facilitate decoding by the receiving device.

In some implementations, the number $N_{shaped}$ of bits to be parsed and input to the shaping encoder 1056 for amplitude-shaping encoding may be calculated according to Equation (3) above. As described above, the pre-shaping parser 1054 or other module of the PHY layer may also generate signaling bits that that indicate how the bits in the information block 1012 were parsed. The signaling bits indicating how the bits in the information block were parsed may ultimately be encoded and transmitted to the receiving device in, for example, an MCS field or another field (such as an EHT-SIG) in a preamble of the wireless packet that will contain the symbols.

As described above, in the illustrated example, the amplitude-shaping encoding operation is only performed on the MSBs 1066. The shaping encoder 1056 performs the amplitude-shaping encoding operation on the MSBs 1066 to generate amplitude-shaped bits 1072. In some implementations, the shaping encoder 1056 may implement aspects of the shaping encoder 710 described with reference to FIG. 7A. As described above, in some implementations, the shaping encoder 1056 adds redundancy to the MSBs 1066 to generate the amplitude-shaped bits 1072 such that the amplitude-shaped bits 1072 include more bits than the MSBs 1066 input to the shaping encoder 1056. By adding redundancy, the shaping encoder 1056 may encode the MSBs 1066 to generate the amplitude-shaped bits 1072 such that the amplitudes of the associated symbols have a non-uniform distribution, and specifically, a distribution in which the probabilities associated with the respective amplitudes generally increase with decreasing amplitude, such as a Gaussian distribution. In some implementations, the number of amplitude-shaped bits output from the shaping encoder 1056 may be given by Equation (4) above.

As described above, in some implementations, the amplitude-shaping encoding operation is or includes an arithmetic encoding operation. For example, the shaping encoder 1056 may be configured to perform an arithmetic encoding operation such as the arithmetic encoding operation described with reference to block 602 of the process 600 of FIG. 6 and the flow 700 of FIG. 7A. In some other implementations, the amplitude-shaping encoding operation is or includes a prefix encoding operation. For example, the shaping encoder 1056 may be configured to perform a prefix encoding operation such as the prefix encoding operation described with reference to block 602 of the process 600 of FIG. 6 and the flow 700 of FIG. 7A. As described above, the shaping encoder 1056 may output signaling bits 1074 indicating the amplitude-shaping encoding operation that was performed, including signaling bits indicating amplitude-shaping encoding parameters that define the non-uniform distribution of the amplitudes or a scrambling sequence or scrambling operation used for the amplitude-shaping encoding operation. The signaling bits indicating the parameters may ultimately be encoded and transmitted to the receiving device in, for example, an MCS field or another field (such as an EHT-SIG) in a preamble of the wireless packet that will contain the symbols.

The systematic encoder 1058 receives the amplitude-shaped bits 1072, the LSBs 1068, the sign bits 1070 and the signaling bits 1074, and performs a systematic encoding operation on the bits to generate a codeword. In some implementations, the systematic encoder 1058 may implement aspects of the systematic encoder 716 described with reference to FIG. 7A. As described above, in some implementations, the performance of the systematic encoding operation encodes the amplitude-shaped bits 1072, the LSBs 1068, the sign bits 1070 and the signaling bits 1074 such that the codeword output from the systematic encoder 1058 also includes the amplitude-shaped bits 1072, the LSBs 1068, the sign bits 1070 and the signaling bits 1074 input to the systematic encoder. For example, in some such implementations, the systematic encoding operation performed is or includes an LDPC encoding operation. As described above, the performance of the systematic encoding operation adds redundancy to the data, for example, by generating a plurality of parity bits based on the amplitude-shaped bits 1072, the LSBs 1068, the sign bits 1070 and the signaling bits 1074. As is also described above, the parity bits may themselves be used as sign bits, and as such, may hereinafter also be referred to as sign bits 1070.

The post-FEC PHY padder 1060 receives the codeword including the amplitude-shaped bits 1072, the LSBs 1068, the sign bits 1070 and the signaling bits 1074 and, for example, based on packet extension requirements, adds post-FEC padding bits 1076 to the codeword to satisfy the packet extension requirements. The amplitude-shaped bits 1072, the LSBs 1068, the sign bits 1070, the signaling bits 1074, and the post-FEC padding bits 1076 may then be arranged into a plurality of symbols as described with reference to block 606 of the process 600 of FIG. 6. For example, the amplitude-shaped bits 1072, the LSBs 1068, the sign bits 1070, the signaling bits 1074, and the post-FEC padding bits 1076 may be provided to an ordering module. In some implementations, the ordering module may implement aspects of the ordering module 724 described with reference to FIG. 7B.

As described above, in some implementations, the ordering module may include a spatial stream parser that parses the amplitude-shaped bits 1072, the LSBs 1068, the sign bits 1070, the signaling bits 1074, and the post-FEC padding bits 1076 into a plurality of spatial streams of symbols. In some such implementations, the spatial stream parser parses the amplitude-shaped bits 1072, the LSBs 1068, the sign bits 1070, the signaling bits 1074, and the post-FEC padding bits 1076 separately for each of the spatial streams to ensure that the bits are properly arranged into the symbols in the different spatial streams. In some implementations, the ordering module additionally includes a plurality of bandwidth segment parsers that parse the symbols from the spatial streams into different bandwidth segments.

The symbols may then be transmitted on a plurality of subcarriers to at least one receiving device in a wireless packet. For example, after spatial stream parsing and bandwidth segment parsing (if performed), each of the different streams of parsed symbols may be provided to a respective constellation mapper that maps the symbols to points in the modulation constellation to obtain a respective stream of complex number representations. For example, the constellation mappers may implement aspects of the constellation mapper 728 described with reference to FIG. 7B. A modulator may then modulate the subcarriers of the bandwidth segments of the wireless channel based on the amplitudes and phases indicated by the complex number representations to generate modulated symbols, which are then transmitted to the receiving device via coupled transmit chains and antennas. For example, the modulator may implement aspects of the modulator 732 described with reference to FIG. 7B, including a plurality of tone mappers, a bandwidth segment deparser, a spatial multiplexer, a transform block, and an analog and RF block.

In some implementations, the wireless communication device 1050 includes corresponding functionality for receiving and decoding modulated symbols. For example, the wireless communication device 1050 may include a post-FEC padding removal module, a systematic decoder, a shaping decoder, a post-deshaping deparser, and a pre-FEC padding removal module. In some such implementations, the shaping decoder and the post-de-shaping deparser are implemented by the PHY layer of the transmitting device. The post-FEC padding removal module, the systematic decoder, and the pre-FEC padding removal module also are implemented by the PHY layer of the transmitting device. In some implementations, the shaping decoder may implement aspects of the shaping decoder 926 described with reference to FIG. 9B. In some such implementations, the post-de-shaping deparser may implement aspects of the post-de-shaping deparser 930 described with reference to FIG. 9B.

As described with reference to the process 600 and the flow 700, and the wireless communication devices 1000 and 1050 described with reference to FIGS. 6-10B, respectively, the amplitude-shaping encoding operation adds redundancy to the amplitude bits input to the shaping encoder, and specifically, such that the number of amplitude-shaped bits output from the shaping encoder is greater than the number of amplitude bits input to the shaping encoder. Because the amplitude-shaping encoding operation results in the encoding of fewer information bits to obtain the same number of symbols as that which may be achieved conventionally, the amplitude-shaping encoding operation results in a reduction of the effective coding rate of the MPDUs. Because the number of amplitude-shaped bits output from the shaping encoder may be content dependent (it depends on the values of the bits input to the shaping encoder), the effective coding rate of the shaping encoder may be intrinsically variable. Additionally, as described above, the number of amplitude-shaped bits output from the shaping encoder also may vary. For example, unlike some arithmetic encoding operations described herein, when using a prefix encoding operation to perform the amplitude shaping, the number of amplitude-shaped bits output from the shaping encoder may be variable.

From the MAC layer perspective, wireless communications are transmitted as frames including MPDUs, and the lengths of the MPDUs are quantized in units of bytes. For example, the MAC layer may package the payload bits in the MPDUs in integer multiples of 4-byte segments. The MAC layer may determine the initial payload length, referred to as the APEP length, which is then used to determine the PSDU length, which may be the sum of the APEP length and the length of any padding bits. But without knowing the number of amplitude-shaped bits that will be output from the shaping encoder, the MAC layer of the wireless communication device may not be able to calculate the packet length accurately in advance of the amplitude-shaping encoding operation. As a result, the MAC layer may not be able to determine the number of padding bits it is necessary to add to the information block to ensure that there are enough bits for the shaping encoder to produce an integer number of symbols. Additionally, without knowing the packet length, the MAC layer cannot signal the packet length to the PHY layer, and as such, the PHY layer may be unable to include the correct packet length in the L-SIG field or the TXOP duration in, for example, the EHT-SIG-A field. As a result, the transmitting device may be unable to inform other wireless communication devices of the duration of time required to transmit the packet. As such, targeted receiving devices may not know when to stop decoding the packet.

As described with reference to the wireless communication device 1000 of FIG. 10A, in some implementations, the shaping encoder may be implemented by the MAC layer. In such implementations, to ensure that the packet has a known length so that the MAC layer can add the requisite number of padding bits and so that the MAC layer can signal the packet length to the PHY layer, the MAC layer calculates or otherwise ascertains the packet length after it has performed the amplitude-shaping encoding operation.

Figure 11:
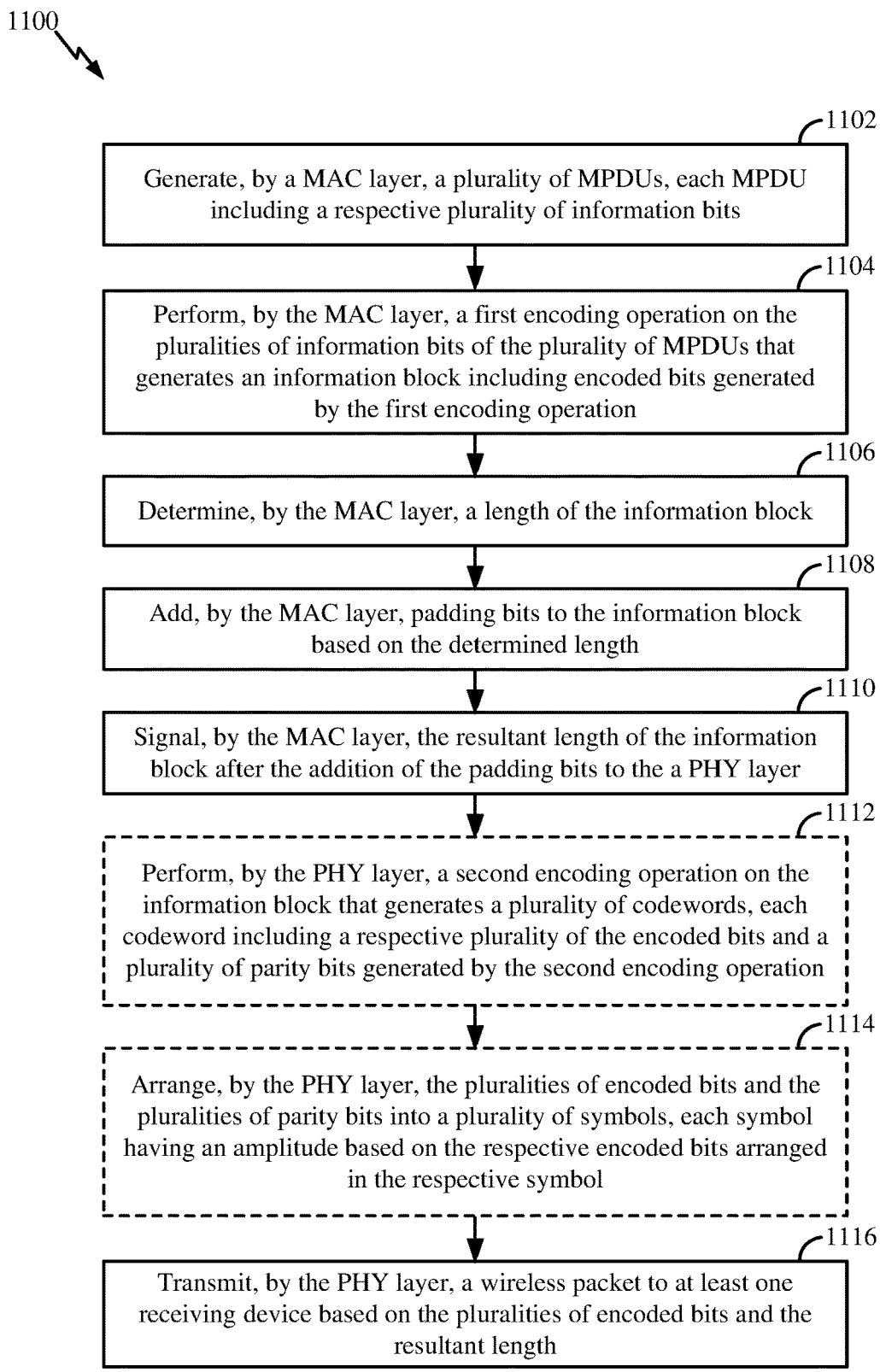
FIG. 11 shows a flowchart illustrating an example process for wireless communication that supports packet length determination according to some implementations.

FIG. 11 shows a flowchart illustrating an example process 1100 for wireless communication that supports packet length determination according to some implementations. The operations of the process 1100 may be implemented by a transmitting device or its components as described herein. For example, the process 1100 may be performed at least in part by a wireless communication device such as the wireless communication device 1000 described with reference to FIG. 10A. In some implementations, the process 1100 may be performed by a wireless communication device operating as or within an AP, such as one of the APs 102 and 502 described with reference to FIGS. 1 and 5A, respectively. In some other implementations, the process 1100 may be performed by a wireless communication device operating as or within a STA, such as one of the STAs 104 and 504 described with reference to FIGS. 1 and 5B, respectively.

In the process 1100, a MAC layer of the transmitting device implements a first encoding operation, and in particular implementations, an amplitude-shaping encoding operation as described above with reference to FIGS. 6-10B. In some implementations, the MAC layer also implements a pre-shaping parsing operation. To ensure that the packet length is determined accurately and signaled to a receiving device, the MAC layer calculates the packet length after performing the first encoding operation. In some implementations, the process 1100 begins in block 1102, with the MAC layer of the wireless communication device generating a plurality of MPDUs, each MPDU including a respective plurality of information bits. The MAC layer may aggregate the MPDUs into an A-MPDU.

In block 1104, a first encoder of the MAC layer (for example, a shaping encoder 1004 as described with reference to FIG. 10A) performs the first (for example, amplitude-shaping) encoding operation on the information bits of the MPDUs that generates an information block including encoded (for example, amplitude-shaped) bits resulting from the first encoding operation performed on the information bits. As described above, in some implementations, the first encoding operation is only performed on a subset of the information bits in block 1104. For example, the information block may first be provided to a pre-shaping parser of the MAC layer (for example, a pre-shaping parser 1002 as described with reference to FIG. 10A) that parses the bits into bits that are to be encoded by the first encoder (for example, including the MSBS of the amplitude bits) and bits that are not to be encoded by the first encoder (for example, LSBs of the amplitude bits, sign bits, control bits, signaling bits, padding bits or other bits). In some implementations, the pre-shaping parser or other module of the MAC layer also generates signaling bits that are then provided to a PHY layer of the transmitting device to inform the PHY layer how the bits in the information block were parsed. For example, this enables the PHY layer to properly arrange the bits into symbols and perform constellation mapping. In some implementations, the number $N_{shaped}$ of bits to be parsed and input to the first encoder for amplitude-shaping encoding may be calculated according to Equation (3) above.

The bits to be shaped are provided to the first encoder for the performance of the first encoding operation in block 1104. As described above, the first encoder may perform amplitude shaping by adding redundancy to the input bits to generate amplitude-shaped bits such that the amplitudes of the associated symbols have a non-uniform distribution, and specifically, a distribution in which the probabilities associated with the respective amplitudes generally increase with decreasing amplitude, such as a Gaussian distribution. The number of encoded bits output from the first encoder may be given by Equation (4) above.

As also described above, in some implementations, the first encoding operation is or includes an arithmetic encoding operation, such as the arithmetic encoding operation described with reference to block 602 of the process 600 of FIG. 6 and the flow 700 of FIG. 7A. In some other implementations, the first encoding operation is or includes a prefix encoding operation, such as the prefix encoding operation described with reference to block 602 of the process 600 of FIG. 6 and the flow 700 of FIG. 7A. As also described above, the first encoder may output signaling bits that are subsequently passed to the PHY layer with the MSBs, LSBs and sign bits indicating the first encoding operation that was performed, such as signaling bits indicating amplitude-shaping encoding parameters that define the non-uniform distribution of the amplitudes or a scrambling sequence or scrambling operation used for the first encoding operation.

In block 1106, the MAC layer (for example, the first encoder or another module) calculates or otherwise determines the length of the information block after the first encoding operation performed in block 1104. As described above, the length of the information block may be equal to the sum of the length of the encoded bits and the length of the non-encoded (for example, unshaped) bits, which may include LSBs, sign bits, signaling bits and padding bits, among other bits as described above. As such, the resultant calculated APEP length is the length of the information block after the performance of the first encoding operation.

In block 1108, the MAC layer may also add padding bits to the information block based on the determined length, for example, to ensure that the information block, for example, a PSDU, provided to the PHY layer has a length equal to an integer multiple of bytes. The encoded bits, the LSBs, the sign bits, any signaling bits, and any padding bits added by the MAC layer may then be passed by the MAC layer to the PHY layer in a new information block, for example, in the form of a PSDU. As such, the MAC layer may calculate or otherwise determine the resultant PSDU length after the performance of the first encoding operation and the addition of the padding bits. In block 1110, the MAC layer may then signal the resultant length of the information block (the PSDU length) after the addition of the padding bits to the PHY layer of the wireless communication device.

In some implementations, a pre-FEC PHY padder of the PHY layer (for example, a pre-FEC PHY padder 1052 as described with reference to FIG. 10B) may also add pre-FEC padding bits to the PSDU. The PHY layer may package the information block into code blocks and the resulting encoded bits for each code block may then be passed to an encoder of the PHY layer along with any sign bits, signaling bits or padding bits in the code block.

In optional block 1112, a second encoder of the PHY layer, for example, a systematic encoder such as an LDPC encoder (for example, a systematic encoder 1058 as described with reference to FIG. 10B), performs a second encoding operation (for example, a systematic encoding operation such as an LDPC encoding operation) on the plurality of code blocks that generates a plurality of respective codewords. Each resultant codeword may include the respective plurality of encoded bits of the respective code block and a plurality of parity bits based on the respective code block. As described above, each code block and resultant codeword also may include previously non-encoded (for example, unshaped) bits such as, for example, LSBs, sign bits, signaling bits and padding bits provided by the pre-shaping parser. In some implementations, a post-FEC PHY padder of the PHY layer (for example, the post-FEC PHY padder 1060 described with reference to FIG. 10B) may add post-FEC padding bits to the codewords to satisfy packet extension requirements.

In some implementations, in optional block 1114, the PHY layer arranges the bits in the codewords including the encoded (for example, amplitude-shaped) bits and the parity bits output by the second encoding operation, as well as any unshaped bits, into a plurality of symbols. As described above, each symbol has an amplitude based at least in part on the respective encoded (amplitude-shaped) bits arranged in the symbol, and the first encoding operation performed in block 1104 may generate the encoded bits such that the amplitudes of the symbols have a non-uniform distribution. For example, the amplitude-shaped bits, the LSBs, the sign bits, any signaling bits, and the post-FEC padding bits may be provided to an ordering module (for example, an ordering module 724 as described with reference to FIG. 7B and block 606 of the process 600 of FIG. 6) that orders the bits into the symbols in block 1114. As described above, in some implementations, the ordering module performs spatial stream parsing and bandwidth segment parsing while arranging the bits into the symbols in block 1114.

In block 1116, the PHY layer transmits a wireless packet to at least one receiving device based on the encoded bits and the resultant length, for example, in the form of modulated symbols. For example, after spatial stream parsing and bandwidth segment parsing (if performed), each of the different streams of symbols may be provided to a respective constellation mapper that maps the symbols to points in the modulation constellation to obtain a respective stream of complex number representations. For example, the constellation mappers may implement aspects of a constellation mapper 728 as described with reference to FIG. 7B. A modulator may then modulate the subcarriers of the bandwidth segments of the wireless channel based on the amplitudes and phases indicated by the complex number representations to generate modulated symbols, which are then transmitted to the receiving device via coupled transmit chains and antennas. For example, the modulator may implement aspects of a modulator 732 as described with reference to FIG. 7B.

Figure 12:
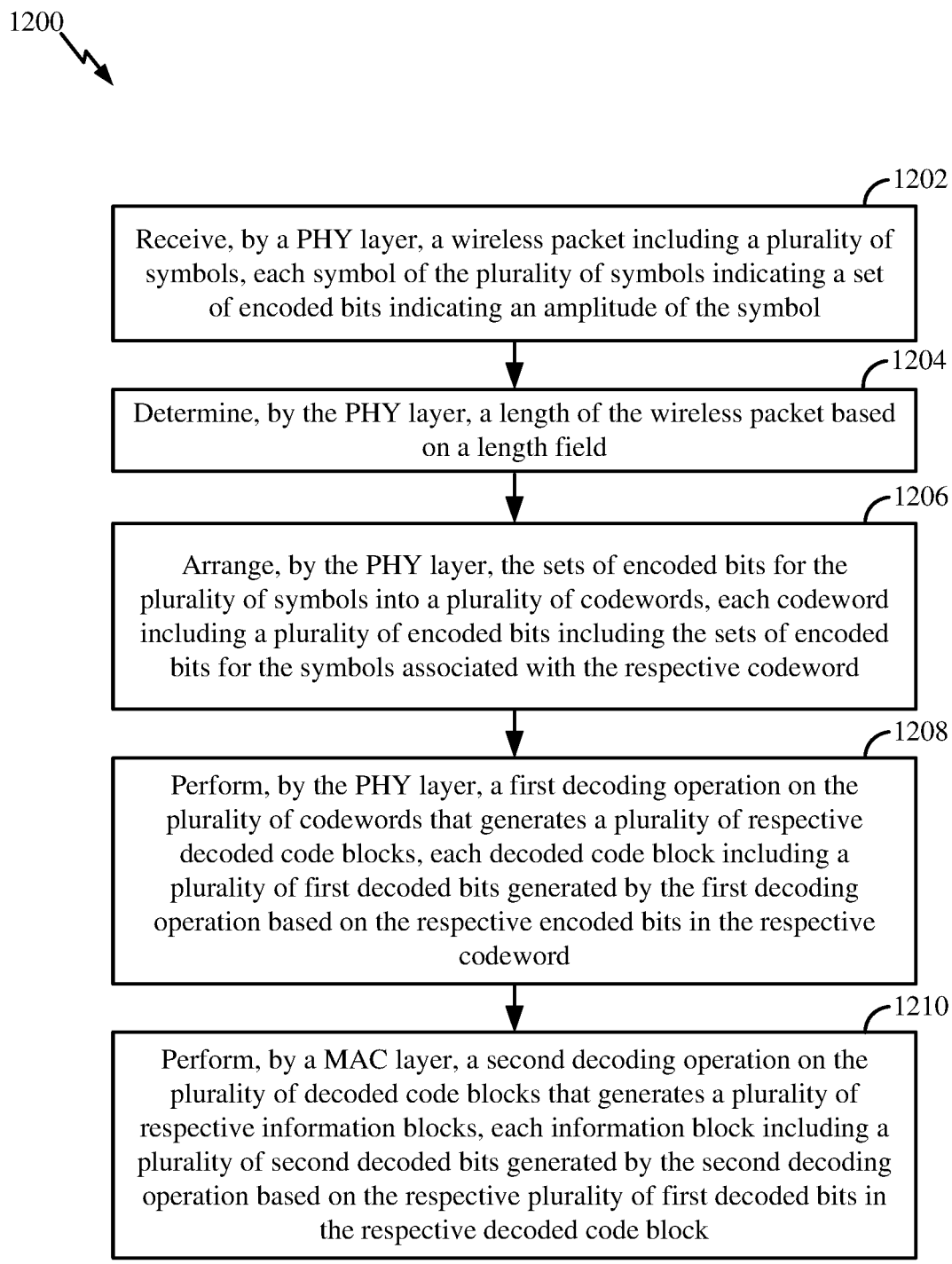
FIG. 12 shows a flowchart illustrating an example process for wireless communication that supports packet length determination according to some implementations.

FIG. 12 shows a flowchart illustrating an example process 1200 for wireless communication that supports packet length determination according to some implementations. The operations of the process 1200 may be implemented by a receiving device or its components as described herein. For example, the process 1200 may be performed at least in part by a wireless communication device such as the wireless communication device 1000 described with reference to FIG. 10A. In some implementations, the process 1200 may be performed by a wireless communication device operating as or within an AP, such as one of the APs 102 and 502 described with reference to FIGS. 1 and 5A, respectively. In some other implementations, the process 1200 may be performed by a wireless communication device operating as or within a STA, such as one of the STAs 104 and 504 described with reference to FIGS. 1 and 5B, respectively.

In the process 1200, a MAC layer of the receiving device implements a first decoding operation, and in particular implementations, an amplitude de-shaping decoding operation. In some implementations, the MAC layer also implements a post-de-shaping deparsing operation. In block 1202, a PHY layer of the receiving device receives a wireless packet including a plurality of symbols. For example, the wireless communication device may receive the wireless packet transmitted by the transmitting device in block 1116 of the process 1100 described with reference to FIG. 11. As described above, each of the received symbols may include or indicate a set of encoded (for example, amplitude-shaped) bits indicating, at least in part, an amplitude of the respective symbol. As also described above, the amplitudes of the received symbols may have a non-uniform distribution, for example, a distribution in which the probabilities associated with the respective amplitudes generally increase with decreasing amplitude, such as a Gaussian distribution.

In some implementations, to receive the packet in block 1202, a demodulator of the PHY layer receives the packet from coupled antennas and receive chains and demodulates the subcarriers of the wireless channel based on the detected amplitudes and phases to generate demodulated symbols in the form of, for example, complex number representations indicating the amplitudes and phases of the symbols. For example, the demodulator may implement aspects of the demodulator 904 described with reference to FIG. 9A. In some implementations, a constellation reverse-mapper may then reverse map the complex number representations from the respective points in the modulation constellation to obtain the demodulated symbols in block 1202. For example, the constellation reverse-mapper may implement aspects of the constellation reverse-mapper 908 described with reference to FIG. 9A.

In block 1204, the PHY layer determines the length of the wireless packet. For example, the PHY layer may determine the length, and ultimately a duration, of the wireless packet based on a length field.

In block 1206, the PHY layer arranges the sets of encoded bits for the received symbols into codewords, each codeword including a block of encoded (for example, amplitude-shaped) bits, including the sets of encoded bits for the symbols associated with the respective codeword (and in some systematic decoding operations, a plurality of parity bits). As described above, each codeword may further include unshaped bits, for example, LSBs, sign bits, signaling bits, and post-FEC padding bits. In some such implementations, a reordering module (for example, a reordering module 912 as described with reference to FIG. 9A and block 604 of the process 600 of FIG. 6) rearranges the bits into the codewords in block 1206. As described above, in some implementations, the reordering module performs spatial stream deparsing and bandwidth segment deparsing while rearranging the bits into the codewords in block 1204. In some implementations, a post-FEC padding removal module of the PHY layer may then remove post-FEC padding bits from the codewords before the codewords are decoded.

In block 1208, a first decoder of the PHY layer, for example, a systematic decoder such as an LDPC decoder (for example, a systematic decoder 916 as described with reference to FIG. 9B), performs a first decoding operation (for example, a systematic decoding operation such as an LDPC decoding operation) on the plurality of codewords that generates a plurality of respective decoded code blocks. Each decoded code block includes a plurality of first decoded bits based on the respective encoded bits and the respective parity bits associated with the respective codeword. As described above, each decoded code block also may include unshaped bits such as, for example, LSBs, sign bits, signaling bits or padding bits. In some implementations, the PHY layer generates a physical layer data unit that represents the MPDUs and that includes the first decode (amplitude-shaped) bits from the decoded code blocks, and in some implementations, any unshaped bits including LSBs, sign bits (which may include control bits or MAC signaling bits) or padding bits from the decoded code blocks. For example, the PHY layer may generate the physical layer data unit in the form of a decoded PSDU that includes the first decoded bits and any decoded unshaped bits.

In block 1210, a second decoder of the MAC layer (for example, a shaping decoder) receives the physical layer data unit and performs a second decoding (for example, amplitude de-shaping) operation on the first decoded bits in each of the decoded code blocks that generates a plurality of respective information blocks including second decoded (for example, de-shaped) amplitude bits. For example, the second decoder may implement aspects of the shaping decoder 926 described with reference to FIG. 9B. As described above, the second decoder removes redundancy from the first decoded bits to generate the second decoded bits. As also described above, in some implementations, the second decoding operation is or includes an arithmetic decoding operation or a prefix decoding operation, such as that described with reference to block 808 of the process 800 described with reference to FIG. 8. As also described above, the shaping decoder may receive signaling bits indicating a first (for example, amplitude-shaping) encoding operation that was performed by the transmitting device, such as signaling bits indicating amplitude-shaping encoding parameters that define the non-uniform distribution of the amplitudes, which may have been conveyed to the receiving device in, for example, an MCS field or another field (such as an EHT-SIG) in a preamble of the wireless packet. For example, the signaling bits may indicate encoding or decoding parameters for use by the second decoder to correctly configure the second decoding operation, including a scrambling sequence or scrambling operation used for the first encoding operation.

In some implementations, to generate an information block for decoding, a post-de-shaping deparser of the MAC layer may deparse the de-shaped amplitude bits, the LSBs, and the sign bits to generate a single stream of bits representing the MPDUs. For example, the post-de-shaping deparser may implement aspects of the post-de-shaping deparser 930 described with reference to FIG. 9B. As also described above, the post-de-shaping deparser may receive signaling bits indicating how the bits in the information block were parsed by the transmitting device, which may have been conveyed to the receiving device in, for example, an MCS field or another field (such as an EHT-SIG) in a preamble of the wireless packet. A pre-FEC padding removal module of the PHY layer may remove pre-FEC padding bits from the deparsed bits. In block 1212, the MAC layer may then perform a third MAC-level decoding operation on the MPDUs.

Figure 13:
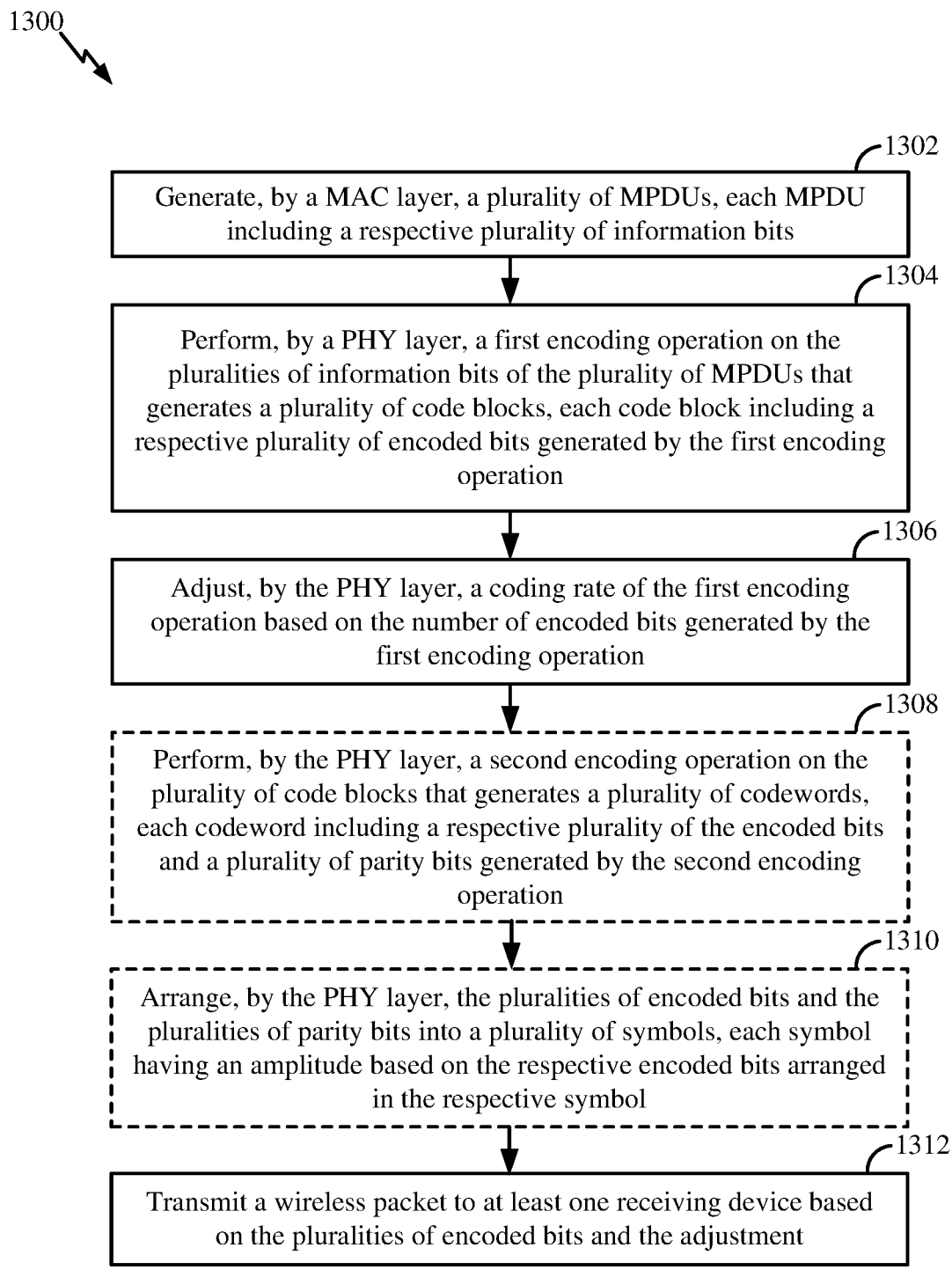
FIG. 13 shows a flowchart illustrating an example process for wireless communication that supports packet length determination according to some implementations.

FIG. 13 shows a flowchart illustrating an example process 1300 for wireless communication that supports packet length determination according to some implementations. The operations of the process 1300 may be implemented by a transmitting device or its components as described herein. For example, the process 1300 may be performed at least in part by a wireless communication device such as the wireless communication device 1050 described with reference to FIG. 10B. In some implementations, the process 1300 may be performed by a wireless communication device operating as or within an AP, such as one of the APs 102 and 502 described with reference to FIGS. 1 and 5A, respectively. In some other implementations, the process 1300 may be performed by a wireless communication device operating as or within a STA, such as one of the STAs 104 and 504 described with reference to FIGS. 1 and 5B, respectively.

In the process 1300, a PHY layer of the transmitting device implements a first encoding operation, and in particular implementations, an amplitude-shaping encoding operation as described above with reference to FIGS. 6-10B. In some implementations, the PHY layer also implements a pre-shaping parsing operation. To ensure that the packet length is determined accurately and signaled to a receiving device, the PHY layer adjusts the coding rate of the first encoding operation such that the coding rate has a fixed value. As described above, a second encoding operation (for example, a systematic encoding operation such as an LDPC encoding operation) having a fixed coding rate may then be subsequently performed. In some implementations, a MAC layer of the transmitting device may only need to know the effective coding rate of the combination of the first encoding operation and the second encoding operation. In such implementations, the MCS table used by the MAC layer to determine the packet length may be based on the effective coding rate. The MAC layer may then use, in some implementations, conventional equations based on the effective coding rate to determine the packet length.

In some implementations, the process 1300 begins in block 1302, with a MAC layer of the wireless communication device generating a plurality of MPDUs, each MPDU including a respective plurality of information bits. The MAC layer may aggregate the MPDUs into an A-MPDU. In block 1304, a first encoder of the PHY layer (for example, a shaping encoder 1056 as described with reference to FIG. 10B) performs the first (for example, an amplitude-shaping) encoding operation on the information bits of the MPDUs that generates a plurality of code blocks, each code block including a plurality of encoded (for example, amplitude-shaped) bits generated by the first encoding operation.

As described above, in some implementations, the first encoding operation is only performed on a subset of the information bits in block 1304. For example, the MAC layer may pass an information block to the PHY layer in the form of a PSDU that includes the information bits for the MPDUs as well as control bits or signaling bits. In some implementations, a pre-FEC PHY padder of the PHY layer (for example, a pre-FEC PHY padder 1052 as described with reference to FIG. 10B) may then add pre-FEC padding bits to the PSDU. The PSDU including the pre-FEC padding bits may then be provided to a pre-shaping parser of the PHY layer (for example, the pre-shaping parser 1054 described with reference to FIG. 10B) that parses the bits into bits that are to be encoded by the first encoder (for example, MSBS of the amplitude bits) and bits that are not to be encoded by the first encoder (for example, LSBs of the amplitude bits, sign bits and the pre-FEC padding bits). In some implementations, the pre-shaping parser or other module of the PHY layer also generates signaling bits indicating how the bits were parsed. In some implementations, the number $N_{shaped}$ of bits to be parsed and input to the first encoder for the first encoding operation may be calculated according to Equation (3) above.

As described above, the bits to be encoded (for example, amplitude-shaped) are provided to the first encoder for the performance of the first encoding operation in block 1304. As described above, the first encoder may add redundancy to the input bits to generate the encoded bits such that the amplitudes of the associated symbols have a non-uniform distribution, and specifically, a distribution in which the probabilities associated with the respective amplitudes generally increase with decreasing amplitude, such as a Gaussian distribution. The number of encoded bits output from the first encoder may be given by Equation (4) above.

As also described above, in some implementations, the first encoding operation is or includes an arithmetic encoding operation, such as the arithmetic encoding operation described with reference to block 602 of the process 600 of FIG. 6 and the flow 700 of FIG. 7A. In some other implementations, the first encoding operation is or includes a prefix encoding operation, such as the prefix encoding operation described with reference to block 602 of the process 600 of FIG. 6 and the flow 700 of FIG. 7A. As also described above, the first encoder may output signaling bits indicating the particular first encoding operation that was performed, including signaling bits indicating amplitude-shaping encoding parameters that define the non-uniform distribution of the amplitudes or a scrambling sequence or scrambling operation used for the first encoding operation.

In block 1306, the first encoder adjusts the coding rate of the first encoding operation performed, or being performed, in block 1304. As described above, to ensure that the first encoding operation results in a fixed coding rate $R_{shaper}$, and thus, a fixed effective coding rate R, the PHY layer may perform a coding rate adjustment on a predetermined interval basis. For example, the coding rate adjustment may be performed on a code block basis or group-of-code-blocks basis. In some other implementations, the coding rate adjustment may be performed on an MPDU or PPDU basis. In some implementations, the effective coding rate R may be determined based on Equation (5) below.

$$R = \frac{N_{shaped} + N_{unshaped}}{\frac{1}{R_{LDPC}}\left(\frac{N_{shaped}}{R_{shaper}} + N_{signaling} + N_{unshaped}\right)} = \frac{R_{LDPC}\left(\frac{2R_{shaper}N_{MSB} +}{R_{LDPC}N_{bpscs} - 2*N_{MSB}}\right)}{R_{LDPC}N_{bpscs}}$$

In Equation (5), $N_{unshaped}$ is equal to the sum of the number of non-encoded (for example, unshaped) bits that are not provided to the first encoder (for example, the LSBs, sign bits and signaling bits) and the number $N_{PAD,pre-FEC}$ of pre-FEC padding bits. The parsing ratio $N_{shaped}:N_{unshaped}$ is dependent on the selected MCS.

In some implementations, to perform the coding rate adjustment in block 1306, the first encoder monitors, during or after the first encoding operation in block 1304, the number of encoded bits it outputs during the first encoding operation. If, during or after the first encoding operation, the first encoder determines that the number of encoded bits exceeds a threshold (for example, an expected codeword length), the first encoder may, in block 1306, perform the coding rate adjustment by changing a probability mass function used in the first encoding operation. For example, in some implementations that use prefix encoding, the first encoder may, in block 1306, stop performing the first encoding operation using the current LUT and begin performing the first encoding operation using a different LUT associated with a different probability mass function. In some such implementations, to perform the coding rate adjustment in block 1306, the first encoder may reperform the first encoding operation on the original information bits to be encoded.

In some other implementations, to perform the coding rate adjustment in block 1306, the first encoder also monitors, during the first encoding operation in block 1304, the number of encoded bits it outputs during the first encoding operation. If, during the first encoding operation, the first encoder determines that the difference between the number of encoded bits it outputs and the number of bits input to the first encoder exceeds a threshold, the first encoder may, in block 1306, perform the coding rate adjustment by stopping performing the first encoding operation. For example, the threshold may be a number $L_{extra}$ of added bits expected to be output by the first encoder as a result of adding redundancy while performing the first encoding operation. In other words, the number $L_{extra}$ of expected bits is equal to the difference between the number of encoded bits output from the first encoder and the number of bits input to the first encoder to be encoded. As such, the threshold $L_{extra}$ may be determined according to Equation (6) below.

$$L_{extra} = L_{in}\left(\frac{1}{R_{shaper}} - 1\right)$$

In Equation (6), $L_{in}$ is the number of bits input to the first encoder and $R_{shaper}$ is the expected coding rate of the first encoding operation over an interval.

If, during the first encoding operation, the first encoder determines that the difference between the number of encoded bits it outputs and the number of bits input to the first encoder exceeds $L_{extra}$, the first encoder may, in block 1306, perform the coding rate adjustment by stopping the first encoding operation being performed in block 1304 and passing (for example, without performing any amplitude-shaping encoding) any remaining information bits that were originally to be encoded directly to a second encoder (for example, an LDPC encoder) as described below. On the other hand, if the first encoder determines that the number $L_{extra}$ of added bits output, or expected to be output, by the first encoder is below a threshold, the first encoder may repeat some of the encoded bits. For example, the first encoder may perform a cyclic repetition in which a first quantity of bits are repeated and appended to the end of the output sequence of encoded bits, or in which a last quantity of bits are repeated and pre-pended to the beginning of the output sequence. In some other implementations, a non-cyclic repetition scheme may be used, for example, a last quantity of bits may be repeated and appended to the end of the output sequence.

In optional block 1308, a second encoder of the PHY layer, for example, a systematic encoder such as an LDPC encoder (for example, a systematic encoder 1058 as described with reference to FIG. 10B), performs a second encoding operation (for example, a systematic encoding operation such as an LDPC encoding operation) on the plurality of code blocks that generates a plurality of respective codewords. Each resultant codeword may include the respective plurality of encoded bits of the respective code block and a plurality of parity bits based on the respective code block. As described above, each code block and resultant codeword also may include non-encoded (for example, unshaped) bits such as, for example, LSBs, sign bits, signaling bits and padding bits provided by the pre-shaping parser, as well as any amplitude bits that were passed directly from the first encoder to the second encoder as a result of the coding rate adjustment operation described above. In some implementations, a post-FEC PHY padder of the PHY layer (for example, the post-FEC PHY padder 1060 described with reference to FIG. 10B) may add post-FEC padding bits to the codewords to satisfy packet extension requirements.

In some implementations, in optional block 1310, the PHY layer arranges the bits in the codewords including the encoded (amplitude-shaped) bits and the parity bits, as well as any unshaped bits, into a plurality of symbols. As described above, each symbol has an amplitude based at least in part on the respective encoded bits arranged in the symbol, and the first encoding operation performed in block 1304 may generate the encoded bits such that the amplitudes of the symbols have a non-uniform distribution. For example, the encoded bits, the LSBs, the sign bits, any signaling bits, and the post-FEC padding bits may be provided to an ordering module (for example, an ordering module 724 as described with reference to FIG. 7B and block 606 of the process 600 of FIG. 6) that orders the bits into the symbols in block 1310. As described above, in some implementations, the ordering module performs spatial stream parsing and bandwidth segment parsing while arranging the bits into the symbols in block 1310.

In block 1312, the PHY layer transmits a wireless packet to at least one receiving device based on the encoded bits and the adjustment, for example, in the form of modulated symbols. For example, after spatial stream parsing and bandwidth segment parsing (if performed), each of the different streams of symbols may be provided to a respective constellation mapper that maps the symbols to points in the modulation constellation to obtain a respective stream of complex number representations. For example, the constellation mappers may implement aspects of the constellation mapper 728 described with reference to FIG. 7B. A modulator may then modulate the subcarriers of the bandwidth segments of the wireless channel based on the amplitudes and phases indicated by the complex number representations to generate modulated symbols, which are then transmitted to the receiving device via coupled transmit chains and antennas. For example, the modulator may implement aspects of the modulator 732 described with reference to FIG. 7B.

Figure 14:
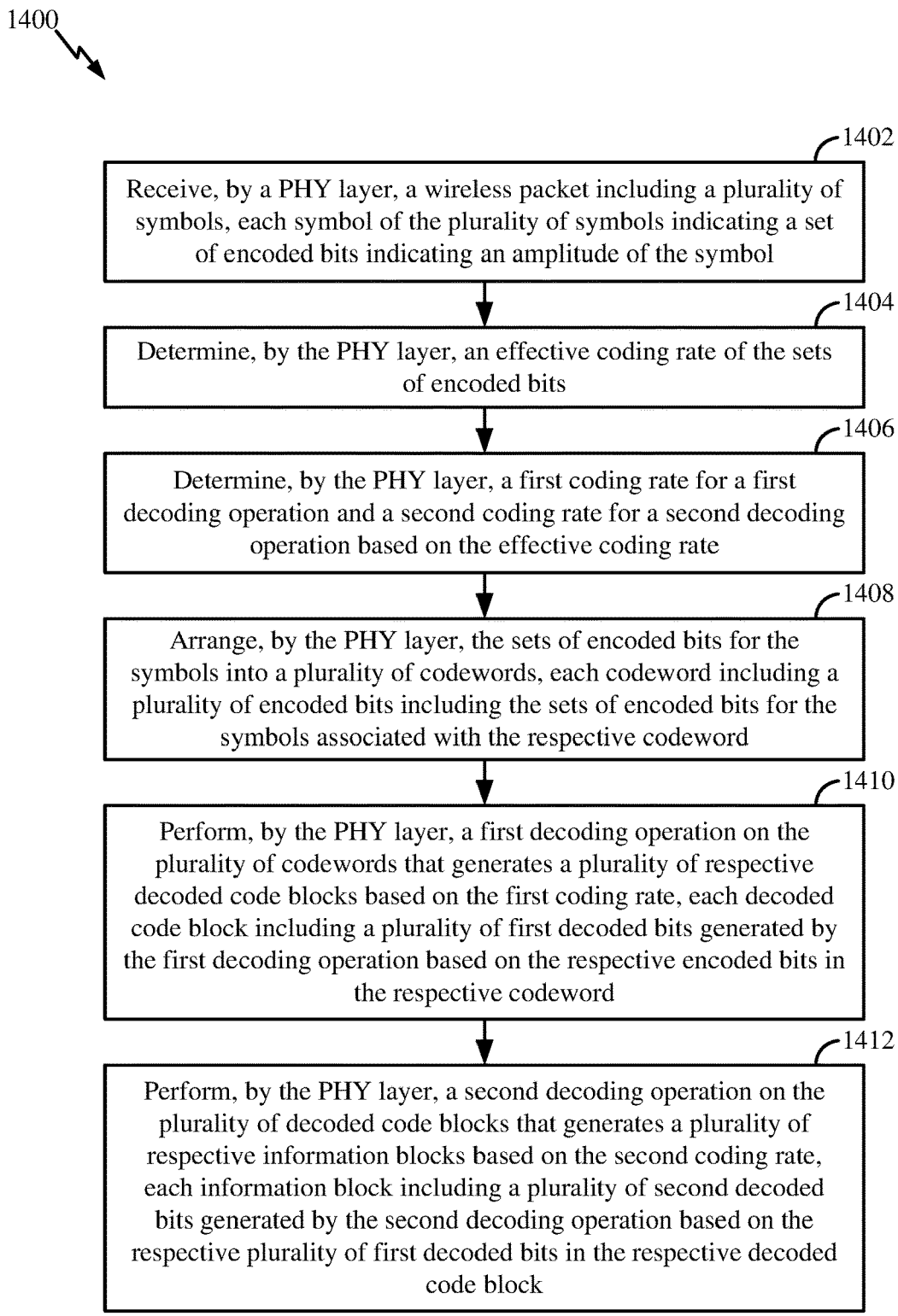
FIG. 14 shows a flowchart illustrating an example process for wireless communication that supports packet length determination according to some implementations.

FIG. 14 shows a flowchart illustrating an example process 1400 for wireless communication that supports packet length determination according to some implementations. The operations of the process 1400 may be implemented by a receiving device or its components as described herein. For example, the process 1400 may be performed at least in part by a wireless communication device such as the wireless communication device 1050 described with reference to FIG. 10B. In some implementations, the process 1400 may be performed by a wireless communication device operating as or within an AP, such as one of the APs 102 and 502 described with reference to FIGS. 1 and 5A, respectively. In some other implementations, the process 1400 may be performed by a wireless communication device operating as or within a STA, such as one of the STAs 104 and 504 described with reference to FIGS. 1 and 5B, respectively.

In block 1402, a PHY layer of the receiving device receives a wireless packet including a plurality of symbols. For example, the receiving device may receive the wireless packet transmitted by the transmitting device in block 1312 of the process 1300 described with reference to FIG. 13. As described above, each of the received symbols may include or indicate a set of encoded (for example, amplitude-shaped) bits indicating, at least in part, an amplitude of the respective symbol. As also described above, the amplitudes of the received symbols may have a non-uniform distribution, for example, a distribution in which the probabilities associated with the respective amplitudes generally increase with decreasing amplitude, such as a Gaussian distribution.

In some implementations, to receive the packet in block 1402, a demodulator of the PHY layer receives the packet from coupled antennas and receive chains and demodulates the subcarriers of the wireless channel based on the detected amplitudes and phases to generate demodulated symbols in the form of, for example, complex number representations indicating the amplitudes and phases of the symbols. For example, the demodulator may implement aspects of the demodulator 904 described with reference to FIG. 9A. In some implementations, a constellation reverse-mapper may then reverse map the complex number representations from the respective points in the modulation constellation to obtain the demodulated symbols in block 1402. For example, the constellation reverse-mapper may implement aspects of the constellation reverse-mapper 908 described with reference to FIG. 9A.

In block 1404, the PHY layer determines an effective coding rate of the sets of encoded bits. For example, the PHY layer may determine the effective coding rate based on signaling bits received in the symbols. In block 1406, the PHY layer determines a first coding (or decoding) rate for a first decoding operation and a second coding (or decoding) rate for a second decoding operation based on the effective coding rate. For example, based on knowledge of the MCS of the wireless packet, the PHY layer may determine the first coding rate. The PHY layer may then determine the second coding rate based on knowledge of the effective coding rate and the first coding rate.

In block 1408, the PHY layer arranges the sets of encoded bits for the received symbols into codewords, each codeword including a plurality of encoded bits including the sets of encoded bits for the symbols associated with the codeword (and in systematic decoding implementations, a plurality of parity bits). As described above, each codeword may further include unshaped bits, for example, LSBs, sign bits, signaling bits, and post-FEC padding bits. In some such implementations, a reordering module (for example, the reordering module 912 described with reference to FIG. 9A and block 804 of the process 600 of FIG. 6) rearranges the bits into the codewords in block 1408. As described above, in some implementations, the reordering module performs spatial stream deparsing and bandwidth segment deparsing while rearranging the bits into the codewords in block 1408. In some implementations, a post-FEC padding removal module of the PHY layer may then remove post-FEC padding bits from the codewords before the codewords are decoded.

In block 1410, a first decoder of the PHY layer, for example, a systematic decoder such as an LDPC decoder (for example, a systematic decoder 916 as described with reference to FIG. 9B), performs a first decoding operation (for example, a systematic decoding operation such as an LDPC decoding operation) on the plurality of codewords based on the first coding rate that generates a plurality of respective decoded code blocks. Each decoded code block includes a plurality of first decoded (for example, amplitude-shaped) bits generated by the first decoding operation based on the respective encoded bits and the respective parity bits associated with the respective codeword. As described above, each decoded code block also may include unshaped bits such as, for example, LSBs, sign bits, signaling bits or padding bits.

In block 1412, a second decoder (for example, a shaping decoder) of the PHY layer performs a second decoding operation (for example, an amplitude de-shaping decoding operation) on the plurality of decoded code blocks that generates a plurality of respective information blocks based on the second coding rate, each information block including a plurality of second decoded (for example, de-shaped) bits generated by the second decoding operation based on the respective plurality of first decoded bits in the respective decoded code block. For example, the second decoder may implement aspects of the shaping decoder 926 described with reference to FIG. 9B. As described above, the second decoder may remove redundancy from the encoded (amplitude-shaped) bits to generate the second decoded (de-shaped) bits. As also described above, in some implementations, the second decoding operation is or includes an arithmetic decoding operation or a prefix decoding operation, such as that described with reference to block 808 of the process 800 described with reference to FIG. 8. As also described above, the shaping decoder may receive signaling bits indicating a first (for example, amplitude-shaping) encoding operation that was performed by the transmitting device, including signaling bits indicating amplitude-shaping encoding parameters that define the non-uniform distribution of the amplitudes, which may have been conveyed to the receiving device in, for example, an MCS field or another field (such as an EHT-SIG) in a preamble of the wireless packet. For example, the signaling bits may indicate encoding or decoding parameters for use by the second decoder to correctly configure the second decoding operation, including a scrambling sequence or scrambling operation used for the first encoding operation. In some implementations, the parameters may be based on an effective coding rate R representing the overall coding rate of both the first decoder and the second decoder.

The PHY layer may then generate a physical layer data unit that represents the MPDUs and that includes the second decoded (de-shaped) bits from the decoded code blocks, and in some implementations, any LSBs, sign bits (which may include control bits or MAC signaling bits), padding bits or other unshaped bits. For example, the PHY layer may generate the physical layer data unit in the form of a decoded PSDU that includes the de-shaped bits and any decoded unshaped bits. In some implementations, to generate the physical layer data unit, a post-de-shaping deparser of the PHY layer may deparse the de-shaped amplitude bits, the LSBs, the sign bits and the padding bits to generate a single stream of bits. For example, the post-de-shaping deparser may implement aspects of the post-de-shaping deparser 930 described with reference to FIG. 9B. As also described above, the post-de-shaping deparser may receive signaling bits indicating how the bits in the information block were parsed by the transmitting device, which may have been conveyed to the receiving device in, for example, an MCS field or another field (such as an EHT-SIG) in a preamble of the wireless packet. A pre-FEC padding removal module of the PHY layer may remove pre-FEC padding bits from the deparsed bits. The MAC layer may then perform a third MAC-level decoding operation on the MPDUs.

As described above, because the number of amplitude-shaped bits output from the shaping encoder may be content dependent, the effective coding rate of the shaping encoder may be intrinsically variable. Without a fixed coding rate, the boundaries between the MPDUs in the A-MPDU may be lost. As described above, from the MAC layer perspective, wireless communications are transmitted as frames including MPDUs, and the lengths of the MPDUs are quantized in units of bytes. For example, the MAC layer may package the payload bits in the MPDUs in integer multiples of bytes, such as integer multiples of 4-byte segments. The MAC layer of the receiving device may identify and track the boundaries between the MPDUs based on decoding the MAC delimiters associated with respective MPDUs. In instances in which the decoding of an MPDU delimiter fails, the MAC layer may scan the other MPDU boundaries to find the next MPDU boundary. In conventional systems, if an MPDU is corrupted or otherwise not decoded successfully, the corruption does not affect the remaining MPDUs, and thus, the remaining MPDUs may still be decoded successfully by the receiving device. However, in implementations that employ amplitude-shaping encoding, because the length of the de-shaped bits at the receiving device may be unknown, if an MPDU is corrupted, the receiving device may not be able to track and identify the MPDU boundaries after the corrupted MPDU.

Figure 15:
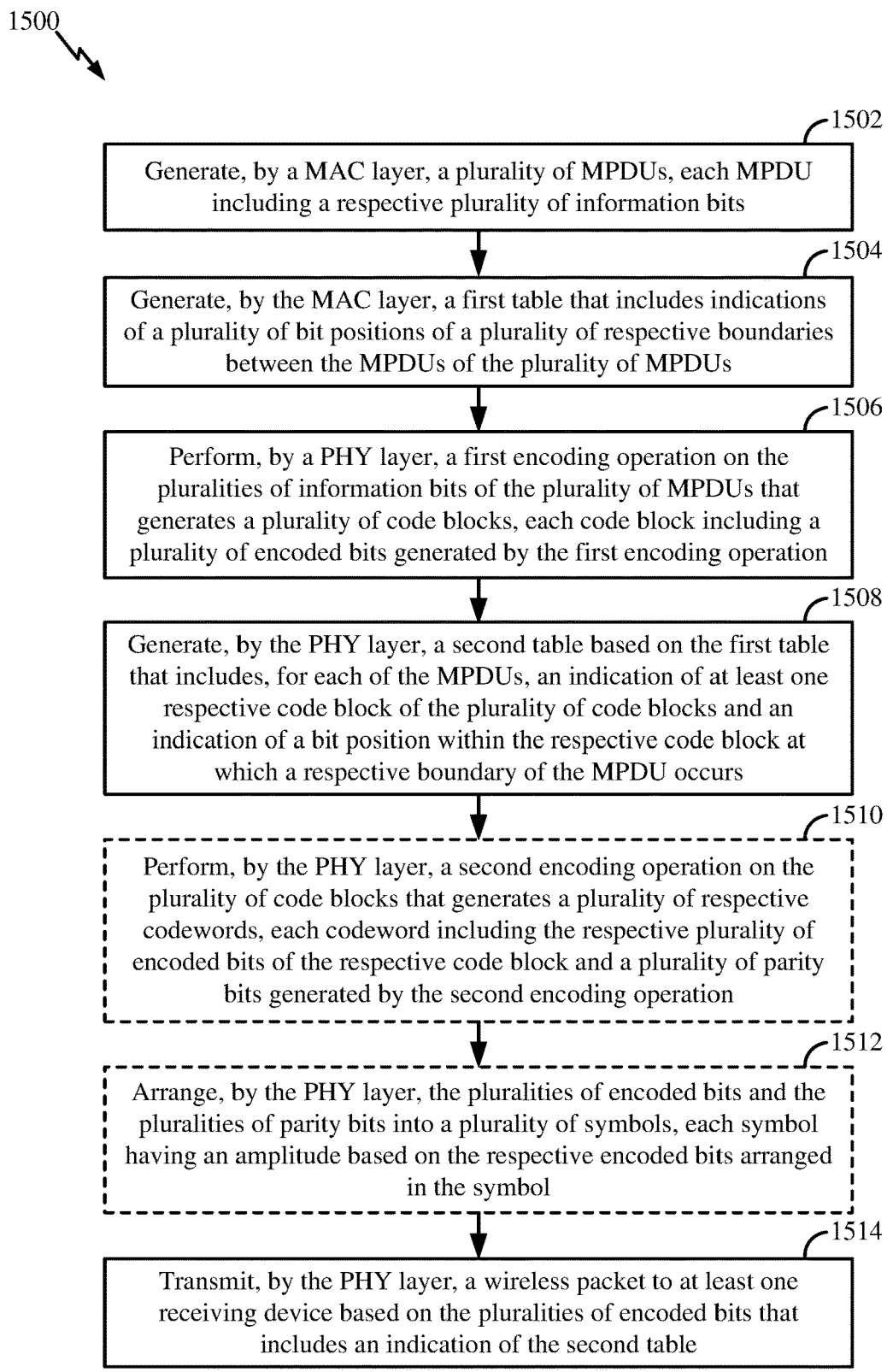
FIG. 15 shows a flowchart illustrating an example process for wireless communication that supports boundary identification according to some implementations.

FIG. 15 shows a flowchart illustrating an example process 1500 for wireless communication that supports boundary identification according to some implementations. The operations of the process 1500 may be implemented by a transmitting device or its components as described herein. For example, the process 1500 may be performed at least in part by a wireless communication device such as the wireless communication device 1050 described with reference to FIG. 10B. In some implementations, the process 1500 may be performed by a wireless communication device operating as or within an AP, such as one of the APs 102 and 502 described with reference to FIGS. 1 and 5A, respectively. In some other implementations, the process 1500 may be performed by a wireless communication device operating as or within a STA, such as one of the STAs 104 and 504 described with reference to FIGS. 1 and 5B, respectively.

In the process 1500, the PHY layer adds additional signaling bits within the packet to indicate to the receiving device the A-MPDU structure, for example, the locations of the boundaries between the MPDUs. In some implementations, the process 1500 begins in block 1502, with a MAC layer of the receiving device generating a plurality of MPDUs, each MPDU including a respective plurality of information bits. The MAC layer may aggregate the MPDUs into an A-MPDU. During or after the generation or aggregation of the MPDUs in block 1502, the MAC layer generates, in block 1504, a first table M1 that includes indications of a plurality of bit positions of a plurality of respective boundaries between the MPDUs in the A-MPDU. For example, in some implementations, the first table M1 includes, for each of the MPDUs, an identification of a length (for example, in bytes) of the MPDU. In such examples, based on an order of the MPDUs in the first table M1, the lengths of the MPDUs identified in the first table M1 implicitly indicate to the PHY layer the respective bit positions of the boundaries of the MPDUs in the A-MPDU. Additionally or alternatively, in some implementations, the first table M1 includes, for each of the MPDUs, an explicit identification of the bit position (for example, an $n^{th}$ bit) of the boundary of the MPDU in the AMPDU. In some implementations, the MAC layer may pass the first table M1 to the PHY layer in the form of a transmit (Tx) vector.

In block 1506, a first encoder of the PHY layer (for example, a shaping encoder 1056 as described with reference to FIG. 10B) performs a first (for example, amplitude-shaping) encoding operation on the information bits of the MPDUs that generates a plurality of code blocks, each code block including a plurality of encoded (for example, amplitude-shaped) bits. As described above, in some implementations, the first encoding operation is only performed on a subset of the information bits in block 1506. For example, the MAC layer may pass an information block to the PHY layer in the form of a PSDU that includes the information bits, as well as control bits or signaling bits, for the MPDUs. In some implementations, a pre-FEC PHY padder of the PHY layer (for example, the pre-FEC PHY padder 1052 described with reference to FIG. 10B) may add pre-FEC padding bits to the PSDU. The PSDU including the pre-FEC padding bits may then be provided to a pre-shaping parser of the PHY layer (for example, the pre-shaping parser 1054 described with reference to FIG. 10B) that parses the bits into bits that are to be encoded by the first encoder (for example, MSBS of the amplitude bits) and bits that are not to be encoded by the first encoder (for example, LSBs of the amplitude bits, sign bits, and the pre-FEC padding bits). In some implementations, the pre-shaping parser or other module of the PHY layer also generates signaling bits indicating how the bits were parsed. In some implementations, the number $N_{shaped}$ of bits to be parsed and input to the first encoder for the performance of the first encoding operation may be calculated according to Equation (3) above.

As described above, the first encoder may add redundancy to the input bits to generate the encoded bits such that the amplitudes of the associated symbols have a non-uniform distribution, and specifically, a distribution in which the probabilities associated with the respective amplitudes generally increase with decreasing amplitude, such as a Gaussian distribution. The number of encoded bits output from the first encoder may be given by Equation (4) above.

As also described above, in some implementations, the first encoding operation is or includes an arithmetic encoding operation, such as the arithmetic encoding operation described with reference to block 602 of the process 600 of FIG. 6 and the flow 700 of FIG. 7A. In some other implementations, the first encoding operation is or includes a prefix encoding operation, such as the prefix encoding operation described with reference to block 602 of the process 600 of FIG. 6 and the flow 700 of FIG. 7A. As also described above, the first encoder may output signaling bits indicating the particular first encoding operation that was performed, including signaling bits indicating amplitude-shaping encoding parameters that define the non-uniform distribution of the amplitudes or a scrambling sequence or scrambling operation used for the first encoding operation.

In block 1508, the PHY layer (for example, the shaping encoder or another module) generates a second table P1 based on the first table that includes, for each of the MPDUs, an indication (for example, an index) of at least one respective code block (or respective codeword) of the plurality of code blocks and an indication of a bit position (for example, an $n^{th}$ bit) within the respective code block at which a respective boundary of the MPDU occurs. For example, the PHY layer may generate the second table P1 in block 1508 during or after the performance of the first encoding operation in block 1506. For example, the PHY layer may translate the first table M1 based on knowledge of the structure of the A-MPDU obtained from the first table M1, and based on the number and locations of the encoded bits output from the first encoder, to generate the second table P1. More particularly, the PHY layer may generate the second table P1 based on knowledge of the bit positions of the MPDU boundaries obtained from the first table M1, and based on knowing the bit positions of the resultant encoded (amplitude-shaped) bits encoded based on the bits at the MPDU boundaries.

In some implementations, the second table P1 includes, for each of the MPDUs, an identification of a length (for example, in encoded bits) of the MPDU in the resultant code blocks (or respective codewords). In such examples, based on an order of the MPDUs in the second table P1, the lengths of the MPDUs identified in the second table P1 implicitly indicate to the receiving device the respective bit positions of the boundaries of the MPDUs in the code blocks. Additionally or alternatively, in some implementations, the second table P1 includes, for each of the MPDUs, an explicit identification of the bit position (for example, an $n^{th}$ bit) of the boundary of the MPDU in the code block.

In some implementations, the resulting encoded bits for each code block may then be passed to a second encoder of the PHY layer along with any sign bits, signaling bits or padding bits in the code block. In optional block 1510, the second encoder, for example, a systematic encoder such as an LDPC encoder (for example, a systematic encoder 1058 as described with reference to FIG. 10B), performs a second encoding operation (for example, a systematic encoding operation such as an LDPC encoding operation) on the plurality of code blocks that generates a plurality of respective codewords. Each resultant codeword includes the respective plurality of encoded bits of the respective code block and a plurality of parity bits based on the respective code block. As described above, each code block and resultant codeword also may include unshaped bits such as, for example, LSBs, sign bits, signaling bits or padding bits provided by the pre-shaping parser.

In some implementations, the second encoding operation is also performed on the signaling bits representing the second table P1. In some such implementations, a first LDPC encoder may perform an LDPC encoding operation on the code blocks and a second LDPC encoder may perform a different LDPC encoding operation on the second table P1. For example, the LDPC encoding operation performed on the second table P1 may use a lower coding rate than that used by the LDPC encoding operation performed on the encoded bits output from the first encoder and the unshaped bits output from the pre-shaping parser. The use of the lower coding rate may increase the robustness of the transmission to ensure that the receiving device is able to correctly decode the second table P1. In some other implementations, instead of performing the second encoding operation on the second table P1, a third encoder of the PHY layer may perform a different encoding operation on the second table P1 that uses a more robust coding scheme such as, for example, a binary convolutional coding (BCC) scheme to achieve greater robustness.

In some implementations, a post-FEC PHY padder of the PHY layer (for example, a post-FEC PHY padder 1060 as described with reference to FIG. 10B) may add post-FEC padding bits to the codewords to satisfy packet extension requirements. In some implementations, in optional block 1512, the PHY layer arranges the bits in the codewords including the encoded (amplitude-shaped) bits and the parity bits, as well as any unshaped bits, into a plurality of symbols. As described above, each symbol has an amplitude based at least in part on the respective encoded bits arranged in the symbol, and the first encoding operation performed in block 1506 may generate the encoded bits such that the amplitudes of the symbols have a non-uniform distribution. For example, the encoded bits, the LSBs, the sign bits, any signaling bits, and the post-FEC padding bits may be provided to an ordering module (for example, the ordering module 724 described with reference to FIG. 7B and block 606 of the process 600 of FIG. 6) that orders the bits into the symbols in block 1512. As described above, in some implementations, the ordering module performs spatial stream parsing and bandwidth segment parsing while arranging the bits into the symbols in block 1512.

In block 1514, the PHY layer transmits a wireless packet to at least one receiving device that includes the symbols and an indication of the second table P1, for example, in the form of modulated symbols. For example, after spatial stream parsing and bandwidth segment parsing (if performed), each of the different streams of symbols may be provided to a respective constellation mapper that maps the symbols to points in the modulation constellation to obtain a respective stream of complex number representations. For example, the constellation mappers may implement aspects of the constellation mapper 728 described with reference to FIG. 7B. A modulator may then modulate the subcarriers of the bandwidth segments of the wireless channel based on the amplitudes and phases indicated by the complex number representations to generate modulated symbols, which are then transmitted to the receiving device via coupled transmit chains and antennas. For example, the modulator may implement aspects of the modulator 732 described with reference to FIG. 7B. In some implementations, for example, in which the same LDPC encoding operation with the same coding rate is performed on the second table P1 and the code blocks, the modulator may modulate the encoded second table P1 with a lower, more robust modulation scheme (for example, MCS 0) than that used for the other symbols in the payload portion to ensure that the receiving device is able to correctly decode the second table P1.

The PHY layer may include the encoded second table P1 in any suitable location within the packet, for example, in a beginning portion of the PSDU payload, in an end portion of the PSDU payload, or in a signal field in the PHY preamble. For example, the PHY layer may include the encoded second table P1 in the EHT-SIG-A field or in another EHT signaling field. In some implementations, the PHY layer may transmit multiple instances of the encoded second table P1 to make the communication of the table P1 more robust to ensure successful decoding. For example, the PHY layer may repeat the encoded second table P1 in time (for example, the encoded second table P1 may be repeated in different symbols such as in two of the symbols of the four symbols in EHT-SIG-A in the extension mode) or frequency (for example, the encoded second table P1 may be repeated on different groups of subcarriers).

Figure 16:
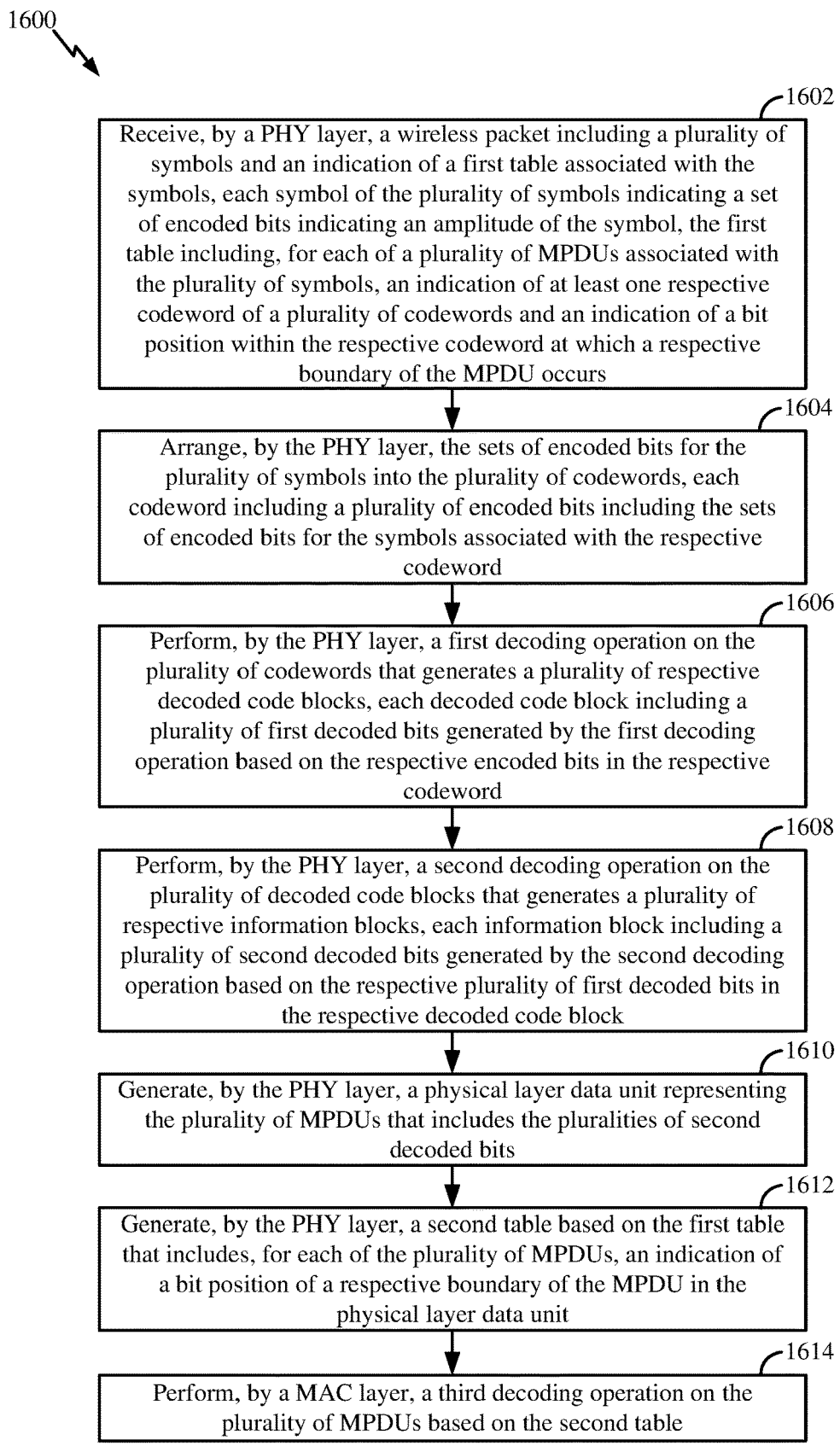
FIG. 16 shows a flowchart illustrating an example process for wireless communication that supports boundary identification according to some implementations.

FIG. 16 shows a flowchart illustrating an example process 1600 for wireless communication that supports boundary identification according to some implementations. The operations of the process 1600 may be implemented by a receiving device or its components as described herein. For example, the process 1600 may be performed at least in part by a wireless communication device such as the wireless communication device 1050 described with reference to FIG. 10B. In some implementations, the process 1600 may be performed by a wireless communication device operating as or within an AP, such as one of the APs 102 and 502 described with reference to FIGS. 1 and 5A, respectively. In some other implementations, the process 1600 may be performed by a wireless communication device operating as or within a STA, such as one of the STAs 104 and 504 described with reference to FIGS. 1 and 5B, respectively.

In block 1602, a PHY layer of the receiving device receives a wireless packet including a plurality of symbols and an indication of a first table P2 associated with the symbols. For example, the PHY layer may receive the wireless packet transmitted by the transmitting device in block 1514 of the process 1500 described with reference to FIG. 15. In such examples, the first table P2 may be the received version of the second table P1 described with reference to the process 1500 of FIG. 15. As described above, each of the received symbols may include or indicate a set of encoded (for example, amplitude-shaped) bits indicating, at least in part, an amplitude of the respective symbol. As also described above, the amplitudes of the received symbols may have a non-uniform distribution, for example, a distribution in which the probabilities associated with the respective amplitudes generally increase with decreasing amplitude, such as a Gaussian distribution.

In some implementations, to receive the packet in block 1602, a demodulator of the PHY layer receives the packet from coupled antennas and receive chains and demodulates the subcarriers of the wireless channel based on the detected amplitudes and phases to generate demodulated symbols in the form of, for example, complex number representations indicating the amplitudes and phases of the symbols. For example, the demodulator may implement aspects of the demodulator 904 described with reference to FIG. 9A. In some implementations, a constellation reverse-mapper may then reverse map the complex number representations from the respective points in the modulation constellation to obtain the demodulated symbols in block 1602. For example, the constellation reverse-mapper may implement aspects of the constellation reverse-mapper 908 described with reference to FIG. 9A.

In block 1604, the PHY layer arranges the sets of encoded bits for the received symbols into the plurality of codewords, each codeword including a plurality of encoded bits including the sets of encoded bits for the symbols associated with the respective codeword (and in systematic decoding implementations, a plurality of parity bits). As described above, each codeword may further include non-encoded (for example, unshaped) bits, for example, LSBs, sign bits, signaling bits, and post-FEC padding bits. In some such implementations, a reordering module (for example, the reordering module 912 described with reference to FIG. 9A and block 804 of the process 600 of FIG. 6) rearranges the bits into the codewords in block 1604. As described above, in some implementations, the reordering module performs spatial stream deparsing and bandwidth segment deparsing while rearranging the bits into the codewords in block 1604.

In some implementations, a post-FEC padding removal module of the PHY layer may then remove post-FEC padding bits from the codewords before the codewords are decoded.

In block 1606, a first decoder of the PHY layer (for example, the systematic decoder 916 described with reference to FIG. 9B), performs a first decoding operation (for example, a systematic decoding operation such as an LDPC decoding operation) on the plurality of codewords that generates a plurality of respective decoded code blocks. Each decoded code block includes a plurality of first decoded (amplitude-shaped) bits generated by the first decoding operation based on the respective encoded bits (and the respective parity bits) in the respective codeword. As described above, each decoded code block also may include unshaped bits such as, for example, LSBs, sign bits, signaling bits or padding bits. In some implementations, the first decoding operation or a third decoding operation (for example, a different LDPC decoding operation or a BCC decoding operation) is also performed on the bits representing the first table P2 to obtain the first table P2.

As described above, the first table P2 may be included in any suitable location within the packet, for example, in a beginning portion of the PSDU payload, in an end portion of the PSDU payload, or in a signal field in the PHY preamble. For example, the PHY layer may include the encoded second table P2 in the EHT-SIG-A field or in another EHT signaling field. In some implementations, the first table P2 includes, for each of a plurality of MPDUs associated with the received symbols, an indication (for example, an index) of a respective code block (or respective codeword) of a plurality of code blocks, and a bit position within the respective code block, at which a boundary of the MPDU occurs. For example, the first table P2 may include, for each of the MPDUs, an identification of a length (for example, in encoded bits) of the MPDU in the code blocks (or respective codewords). In such examples, based on an order of the MPDUs in the first table P2, the lengths of the MPDUs identified in the first table P2 implicitly indicate the respective bit positions of the boundaries of the MPDUs in the code blocks. Additionally or alternatively, in some implementations, the first table P2 includes, for each of the MPDUs, an explicit identification of the bit position (for example, an $n^{th}$ bit) of the boundary of the MPDU in the code block.

In block 1608, a second decoder of the PHY layer performs a second decoding operation (for example, an amplitude de-shaping operation) on the decoded code blocks that generates a plurality of respective information blocks, each information block including a plurality of second decoded (for example, de-shaped) bits generated by the second decoding operation based on the respective plurality of first decoded bits in the respective decoded code block. For example, the second decoder may implement aspects of the shaping decoder 926 described with reference to FIG. 9B. As described above, the second decoder may remove redundancy from the first decoded bits to generate the second decoded bits. As also described above, in some implementations, the second decoding operation is or includes an arithmetic decoding operation or a prefix decoding operation, such as that described with reference to block 808 of the process 800 described with reference to FIG. 8. As also described above, the second decoder may receive signaling bits indicating a first encoding operation that was performed by the transmitting device, including signaling bits indicating amplitude-shaping encoding parameters that define the non-uniform distribution of the amplitudes, which may have been conveyed to the receiving device in, for example, an MCS field or another field (such as an EHT-SIG) in a preamble of the wireless packet. For example, the signaling bits may indicate encoding or decoding parameters for use by the second decoder to correctly configure the second decoding operation, including a scrambling sequence or scrambling operation used for the first encoding operation.

In block 1610, the PHY layer generates a physical layer data unit that represents the MPDUs and that includes the second decoded bits from the decoded code blocks, and in some implementations, any LSBs, sign bits (which may include control bits or MAC signaling bits), padding bits or other unshaped bits. For example, the PHY layer may generate the physical layer data unit in the form of a decoded PSDU that includes the second decoded bits and any decoded unshaped bits. In some implementations, to generate the physical layer data unit in block 1610, a post-de-shaping deparser of the PHY layer may deparse the second decoded bits, the LSBs, the sign bits and the padding bits to generate a single stream of bits. For example, the post-de-shaping deparser may implement aspects of the post-de-shaping deparser 930 described with reference to FIG. 9B. As also described above, the post-de-shaping deparser may receive signaling bits indicating how the bits in the information block were parsed by the transmitting device, which may have been conveyed to the receiving device in, for example, an MCS field or another field (such as an EHT-SIG) in a preamble of the wireless packet. A pre-FEC padding removal module of the PHY layer may remove pre-FEC padding bits from the deparsed bits.

In block 1612, the PHY layer (for example, the second decoder or another module) generates a second table M2 that includes, for each of the MPDUs, an indication of a bit position of a boundary of the MPDU in the PSDU to be provided to the MAC layer. The PHY layer may generate the second table M2 in block 1612 during or after the performance of the second decoding operation in block 1608. In some implementations, the second table M2 includes, for each of the MPDUs, an identification of a length (for example, in bytes) of the MPDU. In such examples, based on an order of the MPDUs in the second table M2, the lengths of the MPDUs identified in the second table M2 may implicitly indicate to the MAC layer the respective bit positions of the boundaries of the MPDUs. Additionally or alternatively, in some implementations, the second table M2 includes, for each of the MPDUs, an explicit identification of the bit position (for example, an $n^{th}$ bit) of the boundary of the MPDU.

The PHY layer may translate the first table P2 based on knowledge of the boundaries of the MPDUs obtained from the first table P2, and based on the number and locations of the second decoded (de-shaped) bits output from the second decoder, to generate the second table M2. More particularly, the PHY layer may generate the second table M2 based on knowledge of the bit positions of the MPDU boundaries in the codewords obtained from the first table P2, and based on knowing the bit positions of the resultant second decoded bits decoded based on the bits at the MPDU boundaries. In some instances, the second table M2 generated by the receiving device may not be exactly identical to the first table M1 generated by the transmitting device, for example, as a result of errors in the decoding of the codewords for one or more of the MPDUs. For example, because the second decoded bits output from the second decoder are dependent on the first decoded bits decoded by the first decoder, if there is an error in the first decoding operation on an MPDU, the location of the boundary of the MPDU in the code block may be lost and the PHY layer may be unable to translate the location of the boundary from the first table P2 to the second table M2. However, the loss of the boundary will not affect the ability to successfully decode the first decoded bits for the remaining MPDUs and to track the MPDU boundaries.

In some implementations, the PHY layer may pass the second table M2 to the MAC layer in the form of a receive (Rx) vector. In block 1614, the MAC layer may then perform a third MAC-level decoding operation on the MPDUs based on the second table M2, and specifically, based on knowledge of the boundaries between the MPDUs.

Figure 17:
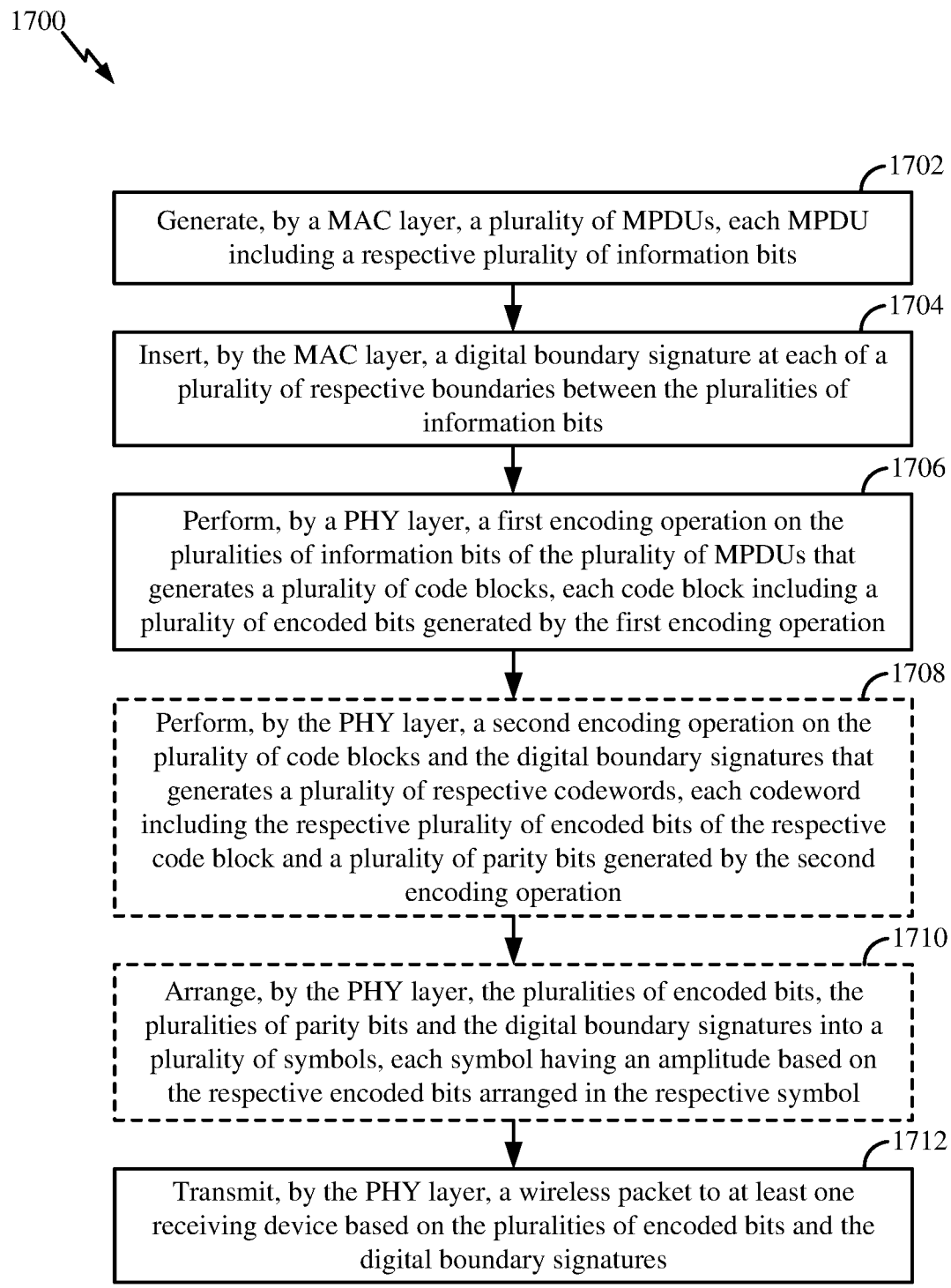
FIG. 17 shows a flowchart illustrating an example process for wireless communication that supports boundary identification according to some implementations.

FIG. 17 shows a flowchart illustrating an example process 1700 for wireless communication that supports boundary identification according to some implementations. The operations of the process 1700 may be implemented by a transmitting device or its components as described herein. For example, the process 1700 may be performed at least in part by a wireless communication device such as the wireless communication device 1050 described with reference to FIG. 10B. In some implementations, the process 1700 may be performed by a wireless communication device operating as or within an AP, such as one of the APs 102 and 502 described with reference to FIGS. 1 and 5A, respectively. In some other implementations, the process 1700 may be performed by a wireless communication device operating as or within a STA, such as one of the STAs 104 and 504 described with reference to FIGS. 1 and 5B, respectively.

In the process 1700, the MAC layer of the transmitting device adds digital boundary signatures to enable the receiving device bits to identify and track the boundaries between the received MPDUs. In some implementations, the process 1700 begins in block 1702, with a MAC layer of the transmitting device generating a plurality of MPDUs, each MPDU including a respective plurality of information bits. The MAC layer may aggregate the MPDUs into an A-MPDU. During or after the generation or aggregation of the MPDUs in block 1702, the MAC layer inserts, in block 1704, a digital boundary signature, for example, in the form of a predetermined bit sequence (a fixed pattern of bit values), at each of the boundaries between adjacent ones of the MPDUs.

In block 1706, a first encoder of the PHY layer (for example, a shaping encoder 1056 as described with reference to FIG. 10B) performs a first encoding (for example, amplitude-shaping) operation on the information bits of the MPDUs that generates a plurality of code blocks, each code block including a plurality of encoded (for example, amplitude-shaped) bits. As described above, in some implementations, the first encoding operation is only performed on a subset of the information bits in block 1708. For example, the MAC layer may pass an information block to the PHY layer in the form of a PSDU that includes the information bits for the MPDUs and the digital signatures (bit sequences) inserted at the boundaries, as well as control bits or signaling bits. In some implementations, a pre-FEC PHY padder of the PHY layer (for example, the pre-FEC PHY padder 1052 described with reference to FIG. 10B) may then add pre-FEC padding bits to the PSDU. The PSDU including the pre-FEC padding bits may then be provided to a pre-shaping parser of the PHY layer (for example, the pre-shaping parser 1054 described with reference to FIG. 10B) that parses the bits into bits that are to be encoded by the first encoder (for example, MSBS of the amplitude bits) and bits that are not to be encoded by the first encoder (for example, LSBs of the amplitude bits, sign bits, the pre-FEC padding bits and the bit sequences indicating the MPDU boundaries). In some implementations, the pre-shaping parser or other module of the PHY layer also generates signaling bits indicating how the bits were parsed. In some implementations, the number $N_{shaped}$ of bits to be parsed and input to the first encoder for the performance of the first encoding operation may be calculated according to Equation (3) above.

As described above, the first encoder may add redundancy to the input bits to generate the encoded (amplitude-shaped) bits such that the amplitudes of the associated symbols have a non-uniform distribution, and specifically, a distribution in which the probabilities associated with the respective amplitudes generally increase with decreasing amplitude, such as a Gaussian distribution. The number of encoded bits output from the first encoder may be given by Equation (4) above.

As also described above, in some implementations, the first encoding operation is or includes an arithmetic encoding operation, such as the arithmetic encoding operation described with reference to block 602 of the process 600 of FIG. 6 and the flow 700 of FIG. 7A. In some other implementations, the first encoding operation is or includes a prefix encoding operation, such as the prefix encoding operation described with reference to block 602 of the process 600 of FIG. 6 and the flow 700 of FIG. 7A. As also described above, the first encoder may output signaling bits indicating the particular first encoding operation that was performed, including signaling bits indicating amplitude-shaping encoding parameters that define the non-uniform distribution of the amplitudes or a scrambling sequence or operation used for the first encoding operation. The signaling bits indicating the parameters may ultimately be encoded and transmitted to the receiving device in, for example, an MCS field or another field (such as an EHT-SIG) in a preamble of the wireless packet that will contain the symbols.

In optional block 1708, a second encoder of the PHY layer, for example, a systematic encoder such as an LDPC encoder (for example, a systematic encoder 1058 as described with reference to FIG. 10B), performs a second encoding operation (for example, a systematic encoding operation such as an LDPC encoding operation) on the plurality of code blocks and the digital boundary signatures that generates a plurality of respective codewords. Each resultant codeword includes the respective plurality of encoded bits of the respective code block (and in systematic encoding implementations, a plurality of parity bits) based on the respective code block. As described above, each code block and resultant codeword also may include unshaped bits such as, for example, the digital boundary signatures, the bit sequences indicating the MPDU boundaries as well as LSBs, sign bits, signaling bits and padding bits provided by the pre-shaping parser. In some implementations, a post-FEC PHY padder of the PHY layer (for example, the post-FEC PHY padder 1060 described with reference to FIG. 10B) may add post-FEC padding bits to the codewords to satisfy packet extension requirements.

In some implementations, in optional block 1710, the PHY layer arranges the bits in the codewords including the encoded (amplitude-shaped) bits, any unshaped bits including the digital boundary signatures, as well as the parity bits into a plurality of symbols. As described above, each symbol has an amplitude based at least in part on the respective encoded bits arranged in the symbol, and the first encoding operation performed in block 1706 may generate the encoded bits such that the amplitudes of the symbols have a non-uniform distribution. For example, the amplitude-shaped bits, the LSBs, the sign bits, any signaling bits, and the post-FEC padding bits may be provided to an ordering module (for example, the ordering module 724 described with reference to FIG. 7B and block 606 of the process 600 of FIG. 6) that orders the bits into the symbols in block 1710. As described above, in some implementations, the ordering module performs spatial stream parsing and bandwidth segment parsing while arranging the bits into the symbols in block 1710.

In block 1712, the PHY layer transmits a wireless packet to at least one receiving device based on the pluralities of encoded bits and the digital boundary signatures, for example, in the form of modulated symbols. For example, after spatial stream parsing and bandwidth segment parsing (if performed), each of the different streams of symbols may be provided to a respective constellation mapper that maps the symbols to points in the modulation constellation to obtain a respective stream of complex number representations. For example, the constellation mappers may implement aspects of the constellation mapper 728 described with reference to FIG. 7B. A modulator may then modulate the subcarriers of the bandwidth segments of the wireless channel based on the amplitudes and phases indicated by the complex number representations to generate modulated symbols, which are then transmitted to the receiving device via coupled transmit chains and antennas. For example, the modulator may implement aspects of the modulator 732 described with reference to FIG. 7B.

Figure 18:
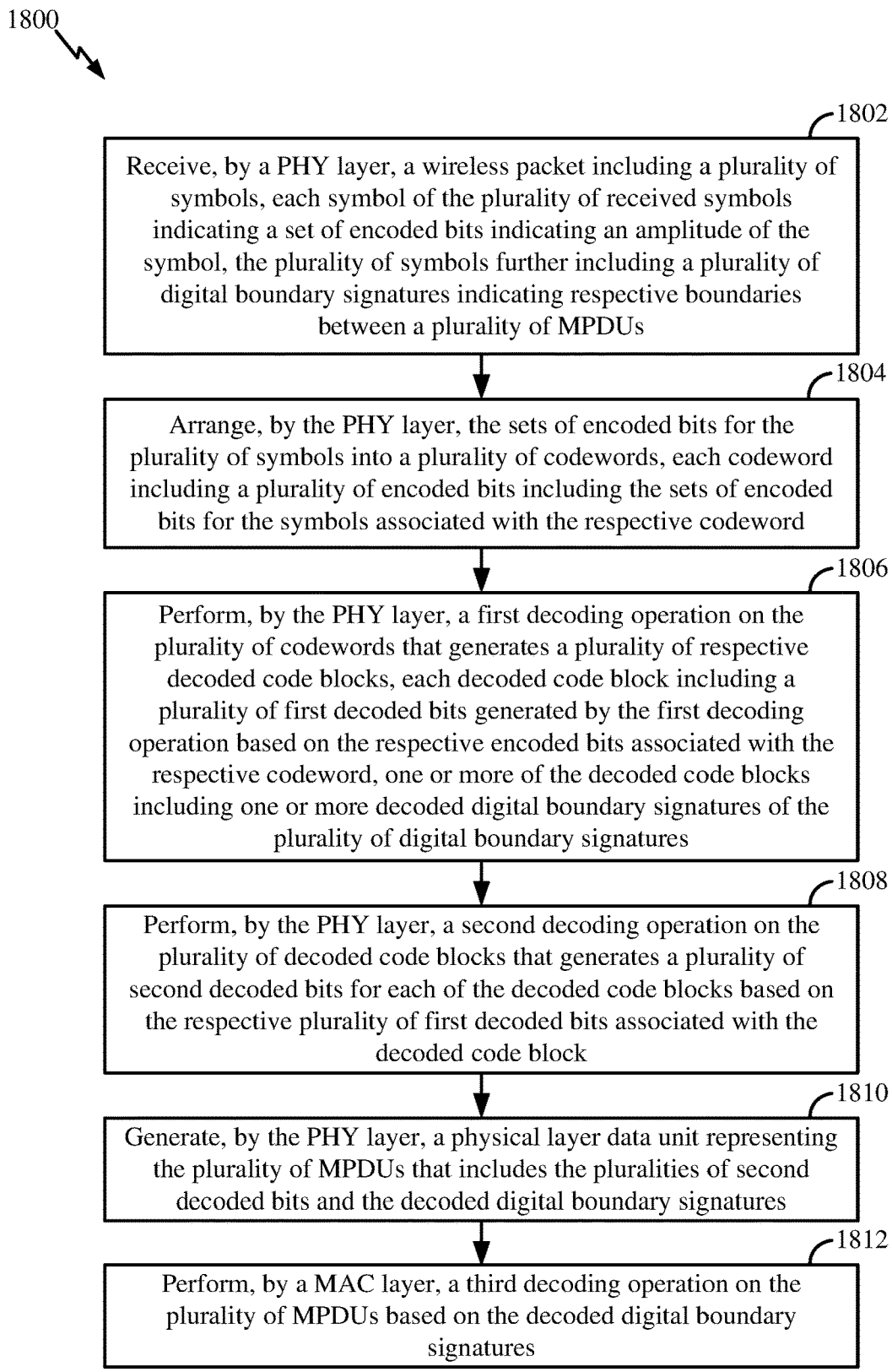
FIG. 18 shows a flowchart illustrating an example process for wireless communication that supports boundary identification according to some implementations.

FIG. 18 shows a flowchart illustrating an example process 1800 for wireless communication that supports boundary identification according to some implementations. The operations of the process 1800 may be implemented by a receiving device or its components as described herein. For example, the process 1800 may be performed at least in part by a wireless communication device such as the wireless communication device 1050 described with reference to FIG. 10B. In some implementations, the process 1800 may be performed by a wireless communication device operating as or within an AP, such as one of the APs 102 and 502 described with reference to FIGS. 1 and 5A, respectively. In some other implementations, the process 1800 may be performed by a wireless communication device operating as or within a STA, such as one of the STAs 104 and 504 described with reference to FIGS. 1 and 5B, respectively.

In block 1802, a PHY layer of the receiving device receives a wireless packet including a plurality of symbols. For example, the wireless communication device may receive the wireless packet transmitted by the transmitting device in block 1712 of the process 1700 described with reference to FIG. 17. As described above, each of the received symbols may include or indicate a set of encoded bits indicating, at least in part, an amplitude of the symbol. As also described above, the amplitudes of the received symbols may have a non-uniform distribution, for example, a distribution in which the probabilities associated with the respective amplitudes generally increase with decreasing amplitude, such as a Gaussian distribution. The plurality of symbols further include a plurality of digital boundary signatures indicating boundaries between MPDUs.

In some implementations, to receive the packet in block 1802, a demodulator of the PHY layer receives the packet from coupled antennas and receive chains and demodulates the subcarriers of the wireless channel based on the detected amplitudes and phases to generate demodulated symbols in the form of, for example, complex number representations indicating the amplitudes and phases of the symbols. For example, the demodulator may implement aspects of the demodulator 904 described with reference to FIG. 9A. In some implementations, a constellation reverse-mapper may then reverse map the complex number representations from the respective points in the modulation constellation to obtain the demodulated symbols in block 1802. For example, the constellation reverse-mapper may implement aspects of the constellation reverse-mapper 908 described with reference to FIG. 9A.

In block 1804, the PHY layer arranges the sets of encoded bits for the received symbols into a plurality of codewords, each codeword including a plurality of encoded bits including the sets of encoded bits for the symbols associated with the respective codeword (and in systematic decoding operations, a plurality of parity bits). As described above, each codeword may further include a digital boundary signature in the form of a bit sequence inserted at an MPDU boundary within the respective codeword. Each codeword may also include other unshaped bits, for example, LSBs, sign bits, signaling bits, and post-FEC padding bits. In some such implementations, a reordering module (for example, the reordering module 912 described with reference to FIG. 9A and block 804 of the process 600 of FIG. 6) rearranges the bits into the codewords in block 1804. As described above, in some implementations, the reordering module performs spatial stream deparsing and bandwidth segment deparsing while rearranging the bits into the codewords in block 1804. In some implementations, a post-FEC padding removal module of the PHY layer may then remove post-FEC padding bits from the codewords before the codewords are decoded.

In block 1806, a first decoder, for example, a systematic decoder such as an LDPC decoder (for example, a systematic decoder 916 as described with reference to FIG. 9B), performs a first decoding operation (for example, a systematic decoding operation such as an LDPC decoding operation) on the plurality of codewords that generates a plurality of respective decoded code blocks. Each decoded code block includes a plurality of first decoded (amplitude-shaped) bits generated by the first decoding operation based on the respective encoded (amplitude-shaped) bits (and in systematic decoding operations, the respective parity bits) associated with the respective codeword. Each of the decoded code blocks may include at least one decoded bit sequence representing a digital boundary signature. As described above, each decoded code block also may include other unshaped bits such as, for example, LSBs, sign bits, signaling bits or padding bits.

In block 1808, a second decoder performs a second decoding operation (for example, an amplitude de-shaping decoding operation) on the decoded code blocks that generates a plurality of second (de-shaped) bits for each of the decoded code blocks based on the respective plurality of first decoded bits associated with the decoded code block. For example, the second decoder may implement aspects of the shaping decoder 926 described with reference to FIG. 9B. As described above, the second decoder may remove redundancy from the first decoded (amplitude-shaped) bits to generate the second decoded (de-shaped) bits. As also described above, in some implementations, the second decoding operation is or includes an arithmetic decoding operation or a prefix decoding operation, such as that described with reference to block 808 of the process 800 described with reference to FIG. 8. As also described above, the second decoder may receive signaling bits indicating the a first encoding operation that was performed by the transmitting device, including signaling bits indicating amplitude-shaping encoding parameters that define the non-uniform distribution of the amplitudes, which may have been conveyed to the receiving device in, for example, an MCS field or another field (such as an EHT-SIG) in a preamble of the wireless packet. For example, the signaling bits may indicate encoding or decoding parameters for use by the second decoder to correctly configure the second decoding operation, including a scrambling sequence or operation used for the first encoding operation.

In block 1810, the PHY layer generates a physical layer data unit representing the MPDUs that includes the second decoded bits from the decoded code blocks and the bit sequences at the MPDU boundaries, as well as any LSBs, sign bits (which may include control bits or MAC signaling bits), padding bits or other unshaped bits. For example, the PHY layer may generate the physical layer data unit in the form of a decoded PSDU that includes the second decoded bits and any decoded unshaped bits. In some implementations, to generate the physical layer data unit in block 1810, a post-de-shaping deparser of the PHY layer may deparse the second decoded bits, the bit sequences indicating the MPDU boundaries, the LSBs, the sign bits and the padding bits to generate a single stream of bits. For example, the post-de-shaping deparser may implement aspects of the post-de-shaping deparser 930 described with reference to FIG. 9B. As also described above, the post-de-shaping deparser may receive signaling bits indicating how the bits in the information block were parsed by the transmitting device, which may have been conveyed to the receiving device in, for example, an MCS field or another field (such as an EHT-SIG) in a preamble of the wireless packet.

A pre-FEC padding removal module of the PHY layer may remove pre-FEC padding bits from the PSDU. The PHY layer may then pass the PSDU to the MAC layer. In block 1812, the MAC layer may then perform a third MAC-level decoding operation on the MPDUs based on knowledge of the boundaries between the MPDUs, and specifically, based on the predetermined bit sequences in the PSDU.

In some implementations, techniques described herein for determining packet lengths and MPDU boundaries can be combined. For example, a transmitting device may combine blocks of the process 1300 with blocks of the process 1500 described with reference to FIGS. 13 and 15, respectively. For example, by combining the process 1500 with the process 1300, the coding rate adjustment may be performed on an MPDU or PPDU basis instead of, for example, a code block or codeword basis.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, the method comprising:
    generating, by a medium access control (MAC) layer of the wireless communication device, a plurality of MAC protocol data units (MPDUs), each MPDU of the plurality of MPDUs including a respective set of information bits such that the plurality of MPDUs includes a plurality of sets of information bits, respectively;
    inserting, by the MAC layer, a plurality of predetermined bit sequences between the plurality of sets of information bits such that there is a predetermined bit sequence at each boundary between respective adjacent sets of information bits of the plurality of sets of information bits;
    performing, by a physical (PHY) layer of the wireless communication device, a first encoding operation on information bits of the plurality of sets of information bits;
    generating a plurality of code blocks based on performing the first encoding operation, each code block of the plurality of code blocks including a respective set of encoded bits generated by the first encoding operation such that the plurality of code blocks includes a plurality of sets of encoded bits, respectively, the plurality of code blocks further including the plurality of predetermined bit sequences indicating the respective boundaries;
    performing, by the PHY layer, a second encoding operation on the plurality of code blocks, including the predetermined bit sequences, that generates a plurality of respective codewords that includes the plurality of predetermined bit sequences; and
    transmitting, by the PHY layer, a wireless packet to at least one receiving device based on the plurality of codewords.

2. The method of claim 1, wherein each codeword of the plurality of codewords includes the respective set of encoded bits of the respective code block and a respective set of parity bits generated by the second encoding operation such that the plurality of codewords includes the plurality of sets of encoded bits and a plurality of sets of parity bits, respectively, the method further comprising:
    arranging, by the PHY layer, the plurality of sets of encoded bits, the plurality of predetermined bit sequences, and the plurality of sets of parity bits into a plurality of symbols, each symbol having an amplitude based on respective encoded bits, of the plurality of sets of encoded bits, arranged in the symbol; and
    wherein transmitting the wireless packet to at least one receiving device comprises transmitting the plurality of symbols.

3. The method of claim 2, wherein the first encoding operation is configured to generate the plurality of sets of encoded bits such that the amplitudes of the plurality of symbols have a non-uniform distribution in which the probabilities associated with the respective amplitudes generally increase with decreasing amplitude.

4. The method of claim 1, wherein the first encoding operation has an intrinsically-variable coding rate.

5. A method for wireless communication by a wireless communication device, the method comprising:
    receiving, by a physical (PHY) layer of the wireless communication device, a wireless packet including a plurality of symbols, the plurality of symbols collectively representing a plurality of medium access control (MAC) protocol data units (MPDUs) and a plurality of predetermined bit sequences, each symbol of the plurality of symbols having a respective amplitude indicating respective encoded bits;
    arranging, by the PHY layer, the encoded bits indicated by the amplitudes of the plurality of symbols into a plurality of codewords, each codeword of the plurality of codewords including a respective set of encoded bits of the encoded bits indicated by the amplitudes of the plurality of symbols such that the plurality of codewords includes a plurality of sets of encoded bits;
    performing, by the PHY layer, a first decoding operation on the plurality of codewords that generates a plurality of decoded code blocks including the plurality of predetermined bit sequences, each decoded code block of the plurality of decoded code blocks including a respective set of first decoded bits generated by the first decoding operation based on the set of encoded bits in a respective codeword of the plurality of codewords such that the plurality of decoded code blocks includes a plurality of sets of first decoded bits, respectively, and the plurality of predetermined bit sequences; and
    performing, by the PHY layer, a second decoding operation on the plurality of sets of first decoded bits that generates second decoded bits;

generating, by the PHY layer, a physical layer data unit that includes the second decoded bits and the plurality of predetermined bit sequences, the plurality of MPDUs including the second decoded bits; and performing, by a MAC layer of the wireless communication device, a third decoding operation on the plurality of MPDUs based on the plurality of predetermined bit sequences, each predetermined bit sequence of the plurality of predetermined bit sequences being at a respective boundary between respective adjacent MPDUs of the plurality of MPDUs.

6. A method for wireless communication by a wireless communication device, the method comprising:

generating, by a medium access control (MAC) layer of the wireless communication device, a plurality of MAC protocol data units (MPDUs), each MPDU of the plurality of MPDUs including a respective set of information bits such that the plurality of MPDUs includes a plurality of sets of information bits, respectively;

performing, by a physical (PHY) layer of the wireless communication device, a first encoding operation on information bits of the plurality of sets of information bits;

generating a plurality of code blocks based on performing the first encoding operation, each code block of the plurality of code blocks including a respective set of encoded bits generated by the first encoding operation such that the plurality of code blocks includes a plurality of sets of encoded bits, respectively;

adjusting, by the PHY layer, a coding rate of the first encoding operation based on a number of encoded bits generated by the first encoding operation; and transmitting, by the PHY layer, a wireless packet to at least one receiving device based on the plurality of sets of encoded bits and the adjustment.

7. The method of claim 6, further comprising:

performing, by the PHY layer, a second encoding operation on the plurality of code blocks that generates a plurality of respective codewords, each codeword of the plurality of codewords including the respective set of encoded bits of the respective code block and a respective set of parity bits generated by the second encoding operation such that the plurality of codewords includes the plurality of sets of encoded bits and a plurality of sets of parity bits, respectively; and arranging, by the PHY layer, the plurality of sets of encoded bits and the plurality of sets of parity bits into a plurality of symbols, each symbol having an amplitude based on respective encoded bits, of the plurality of sets of encoded bits, arranged in the symbol; and wherein transmitting the wireless packet to at least one receiving device comprises transmitting the plurality of symbols.

8. The method of claim 7, wherein the first encoding operation is configured to generate plurality of sets of the encoded bits such that the amplitudes of the plurality of symbols have a non-uniform distribution in which the probabilities associated with the respective amplitudes generally increase with decreasing amplitude.

9. The method of claim 6, wherein the first encoding operation has an intrinsically-variable coding rate.

10. The method of claim 6, wherein the adjustment, by the PHY layer, of the coding rate of the first encoding operation comprises adjusting, by the PHY layer, the coding rate of the first encoding operation on a code-block basis, a group-of-code-blocks basis, or an MPDU basis, based on the number of encoded bits generated by the first encoding operation.

11. The method of claim 6, further comprising:

monitoring, during or after the first encoding operation, the number of encoded bits generated by the first encoding operation; and determining whether the number of encoded bits is greater than a threshold; and wherein the adjustment, by the PHY layer, of the coding rate of the first encoding operation is responsive to the determination.

12. The method of claim 6, further comprising:

monitoring the number of encoded bits generated by the first encoding operation;

monitoring a number of information bits input to the first encoding operation;

determining whether a difference between the number of encoded bits generated by the first encoding operation and the number of information bits input to the first encoding operation is greater than a threshold; and wherein the adjustment, by the PHY layer, of the coding rate of the first encoding operation is responsive to the determination.

13. The method of claim 12, wherein the adjustment comprises stopping the first encoding operation responsive to determining that the difference is greater than the threshold.

14. The method of claim 12, wherein the adjustment comprises repeating one or more of the encoded bits responsive to determining that the difference is less than a threshold.

15. The method of claim 6, wherein the adjustment, by the PHY layer, of the coding rate of the first encoding operation comprises changing a probability mass function associated with the first encoding operation.

16. The method of claim 15, wherein the first encoding operation comprises a prefix encoding operation and changing the probability mass function associated with the first encoding operation comprises switching from using a first look-up table associated a first probability mass function to a second look-up table associated with a second probability mass function to perform the prefix encoding operation.

17. A method for wireless communication by a wireless communication device, the method comprising:

receiving, by a physical (PHY) layer of the wireless communication device, a wireless packet including a plurality of symbols, the plurality of symbols collectively representing a plurality of medium access control (MAC) protocol data units (MPDUs), each symbol of the plurality of symbols having a respective amplitude indicating respective encoded bits;

determining, by the PHY layer, an effective coding rate of the encoded bits indicated by the amplitudes of the plurality of symbols;

determining, by the PHY layer, a first coding rate for a first decoding operation and a second coding rate for a second decoding operation based on the effective coding rate;

arranging, by the PHY layer, the encoded bits indicated by the amplitudes of the plurality of symbols into a plurality of codewords, each codeword of the plurality of codewords including a respective set of encoded bits of the encoded bits indicated by the amplitudes of the plurality of symbols such that the plurality of codewords includes a plurality of sets of encoded bits;

performing, by the PHY layer, a first decoding operation on the plurality of codewords based on the first coding rate that generates a plurality of decoded code blocks, each decoded code block of the plurality of decoded code blocks including a respective set of first decoded bits generated by the first decoding operation based on the set of encoded bits in a respective codeword of the plurality of codewords such that the plurality of decoded code blocks includes a plurality of sets of first decoded bits, respectively; and performing, by the PHY layer, a second decoding operation on the plurality of sets of first decoded bits based on the second coding rate that generates second decoded bits.

\* \* \* \* \*